(12) United States Patent
Buntinx

(10) Patent No.: US 9,167,428 B2
(45) Date of Patent: Oct. 20, 2015

(54) METHOD AND SYSTEM FOR AUTHENTICATING ENTITIES BY MEANS OF TERMINALS

(75) Inventor: Luc Buntinx, Zonhoven (BE)

(73) Assignee: Buntinx, Zonhoven (BE)

( * ) Notice: Subject to any disclaimer, the term of this patent is extended or adjusted under 35 U.S.C. 154(b) by 133 days.

(21) Appl. No.: 14/009,428

(22) PCT Filed: Apr. 4, 2012

(86) PCT No.: PCT/EP2012/001504
§ 371 (c)(1),
(2), (4) Date: Oct. 2, 2013

(87) PCT Pub. No.: WO2012/136366
PCT Pub. Date: Oct. 11, 2012

(65) Prior Publication Data
US 2014/0026204 A1    Jan. 23, 2014

(30) Foreign Application Priority Data
Apr. 4, 2011    (EP) ..................................... 11161033

(51) Int. Cl.
*H04L 9/08*      (2006.01)
*H04W 12/06*  (2009.01)
*H04L 29/06*    (2006.01)

(52) U.S. Cl.
CPC ............. *H04W 12/06* (2013.01); *H04L 63/062* (2013.01); *H04L 63/08* (2013.01); *H04L 63/10* (2013.01); *H04L 63/168* (2013.01)

(58) Field of Classification Search
None
See application file for complete search history.

(56) References Cited

U.S. PATENT DOCUMENTS

2008/0244714 A1* 10/2008 Kulakowski et al. ............. 726/5
2013/0173915 A1*  7/2013 Haulund ....................... 713/159

FOREIGN PATENT DOCUMENTS

JP    2008-048135    2/2008
JP    2008-090512    4/2008

OTHER PUBLICATIONS

Alexandre Alapetite, "Dymanic 2D-barcodes fro multi-device Web session migration including mobile phones," Personal and Ubiquitous Computing, Springer-Verlag London Ltd. 2009, vol. 14, No. 1, Apr. 2, 2009, pp. 45-52, XP019783613, ISSN 1617-4917 (8 pages).
International Search Report dated Aug. 13, 2012, for International Application No. PCT/2012/001504, Applicant, Buntinx (3 pages).
European Patent Office Search Report dated Nov. 10, 2011, for European Patent Application No. EP 11161033 (3 pages).

* cited by examiner

*Primary Examiner* — Saleh Najjar
*Assistant Examiner* — William G O'Hara
(74) *Attorney, Agent, or Firm* — Koppel, Patrick, Heybl & Philpott

(57) ABSTRACT

In the disclosed method, users are provided with sets of authentication codes, each set includes a secret, a private key container and a matching public key container, the private and public key container are generated from respectively a first string including a domain name of an authentication server system and a PKI private key and a second string including the same domain name and a matching PKI public key. Upon receipt on the authentication server system of the first strings as a result of a first user reading the respective private key container, an action definition procedure is performed in which the first user is requested to enter a secret of the same set of authentication codes. If a check returns a positive result, the first user can define a set of actions to be performed upon receipt of the second string belonging to the same set of authentication codes.

22 Claims, 29 Drawing Sheets

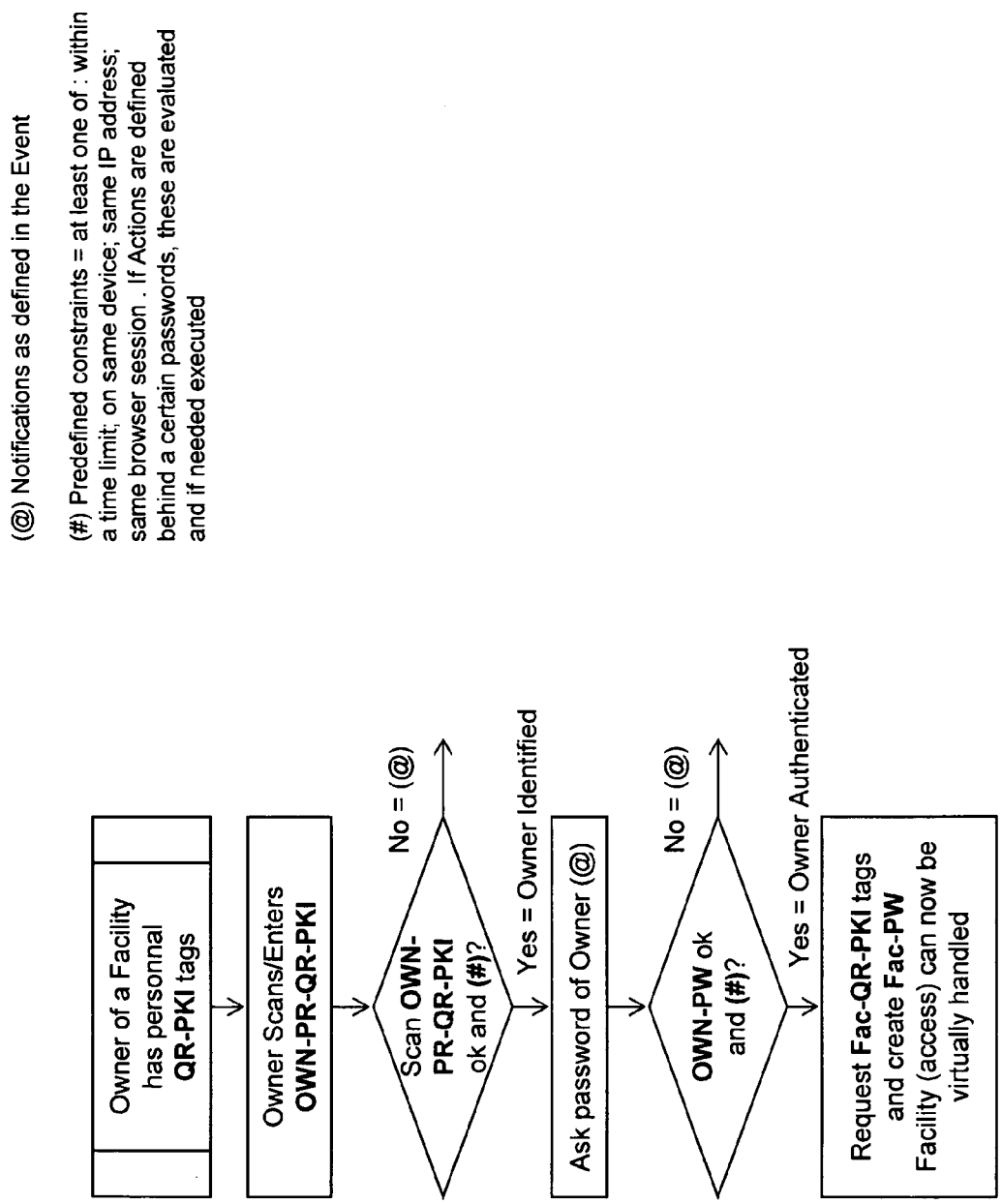
FIG. 9a: Case 1 (Setup : Access to a Facility)

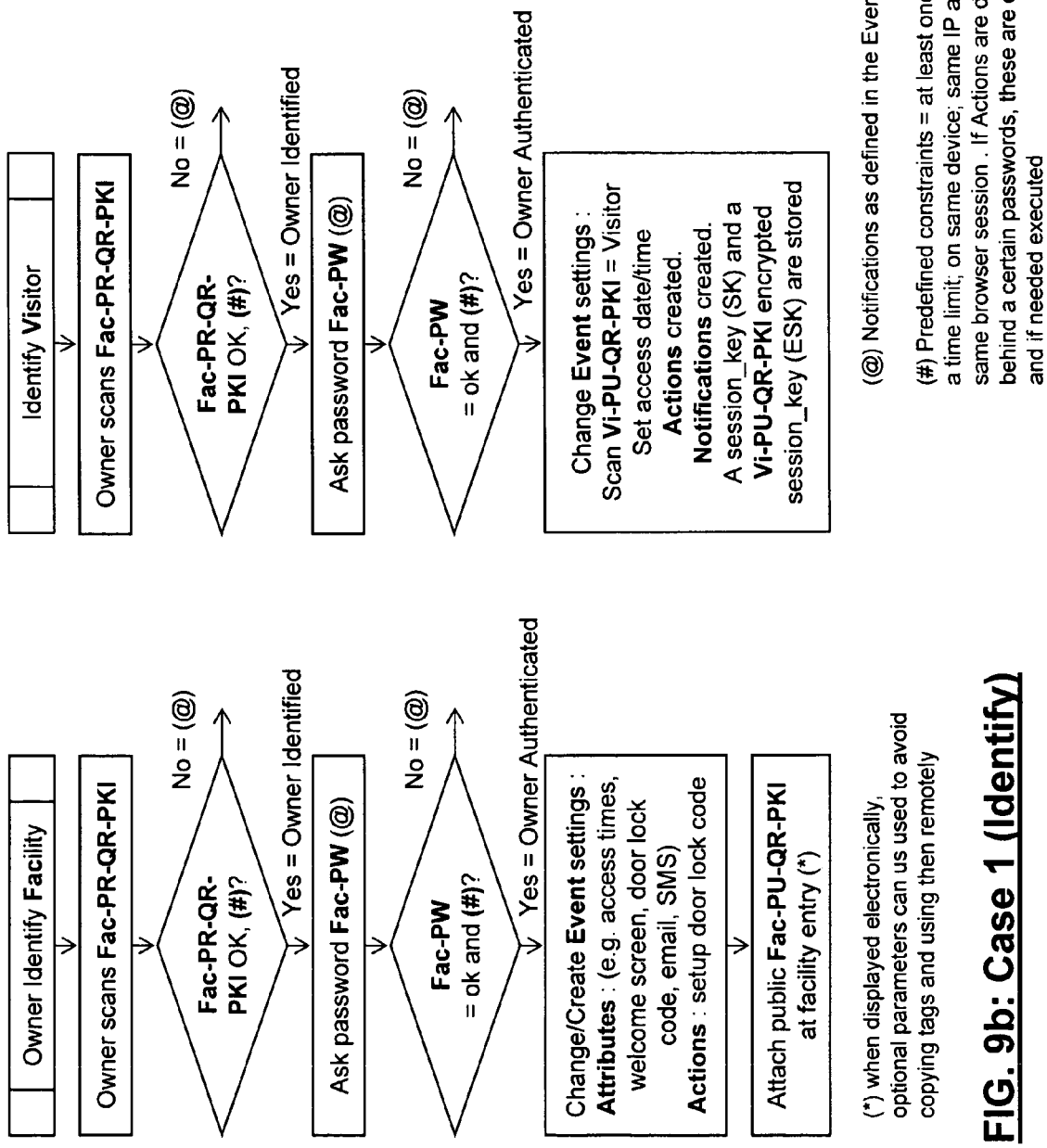
FIG. 9b: Case 1 (Identify)

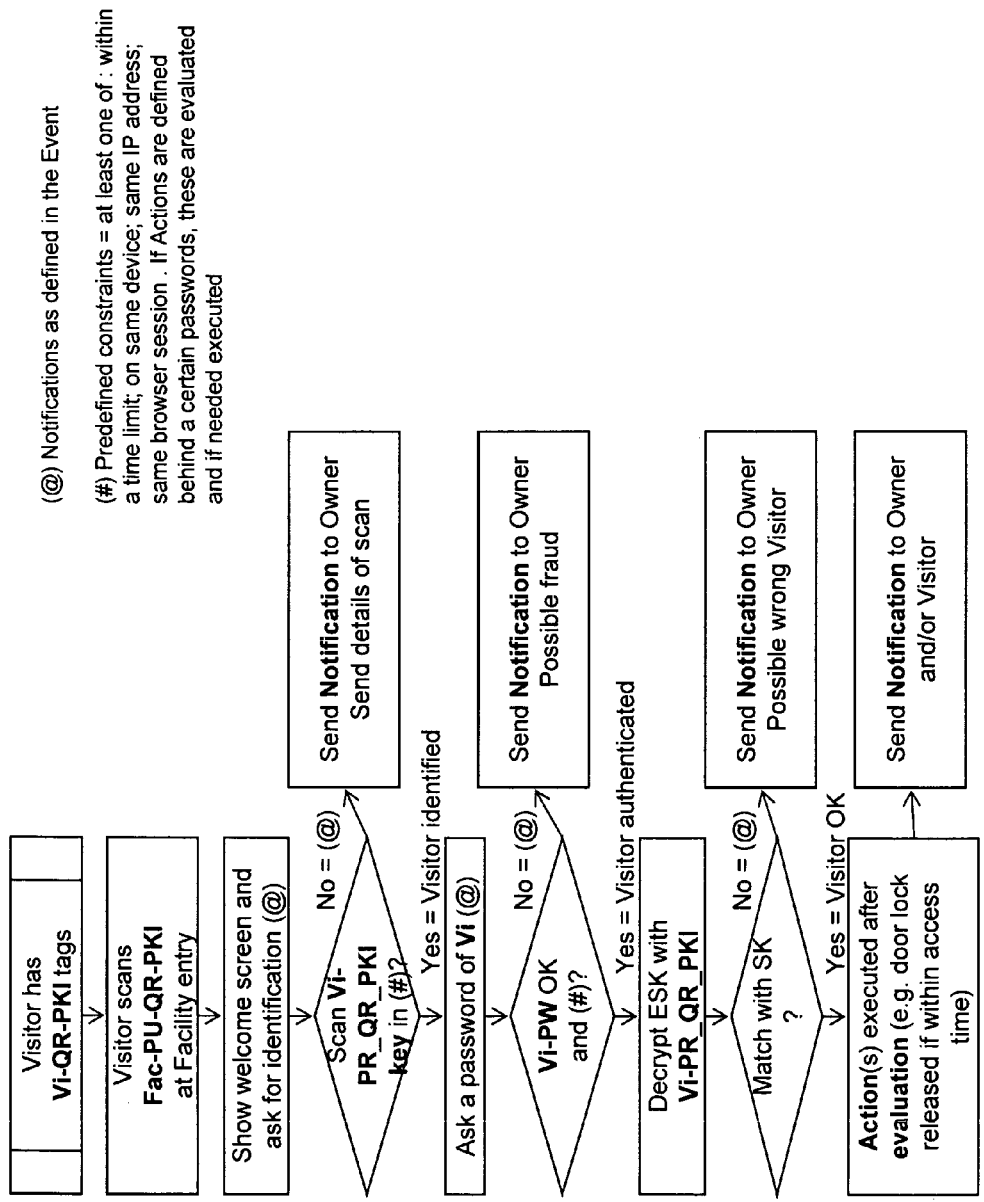
FIG. 9c: Case 1 (Access by Visitor)

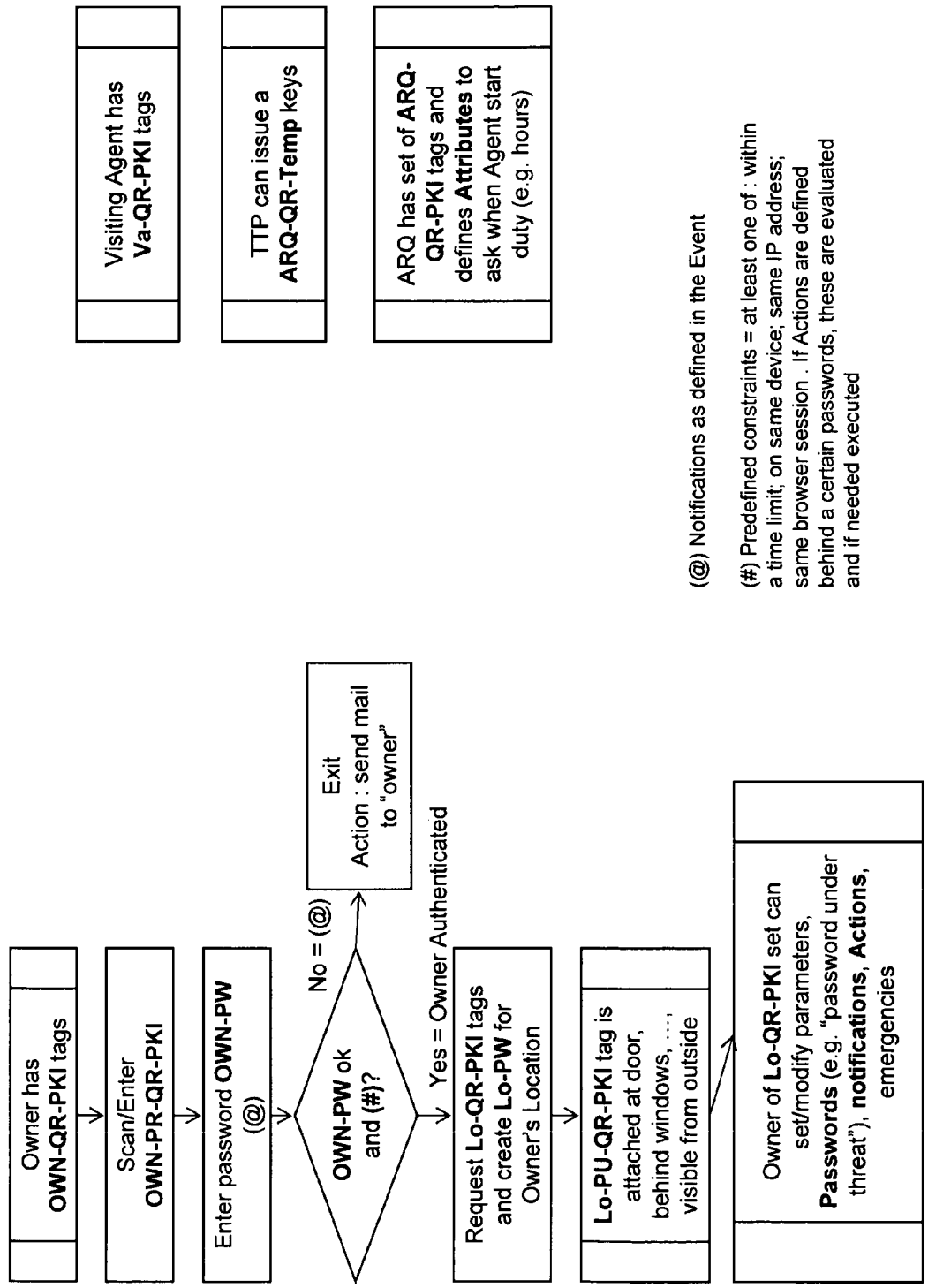
FIG. 10a: Case 2 (Setup)

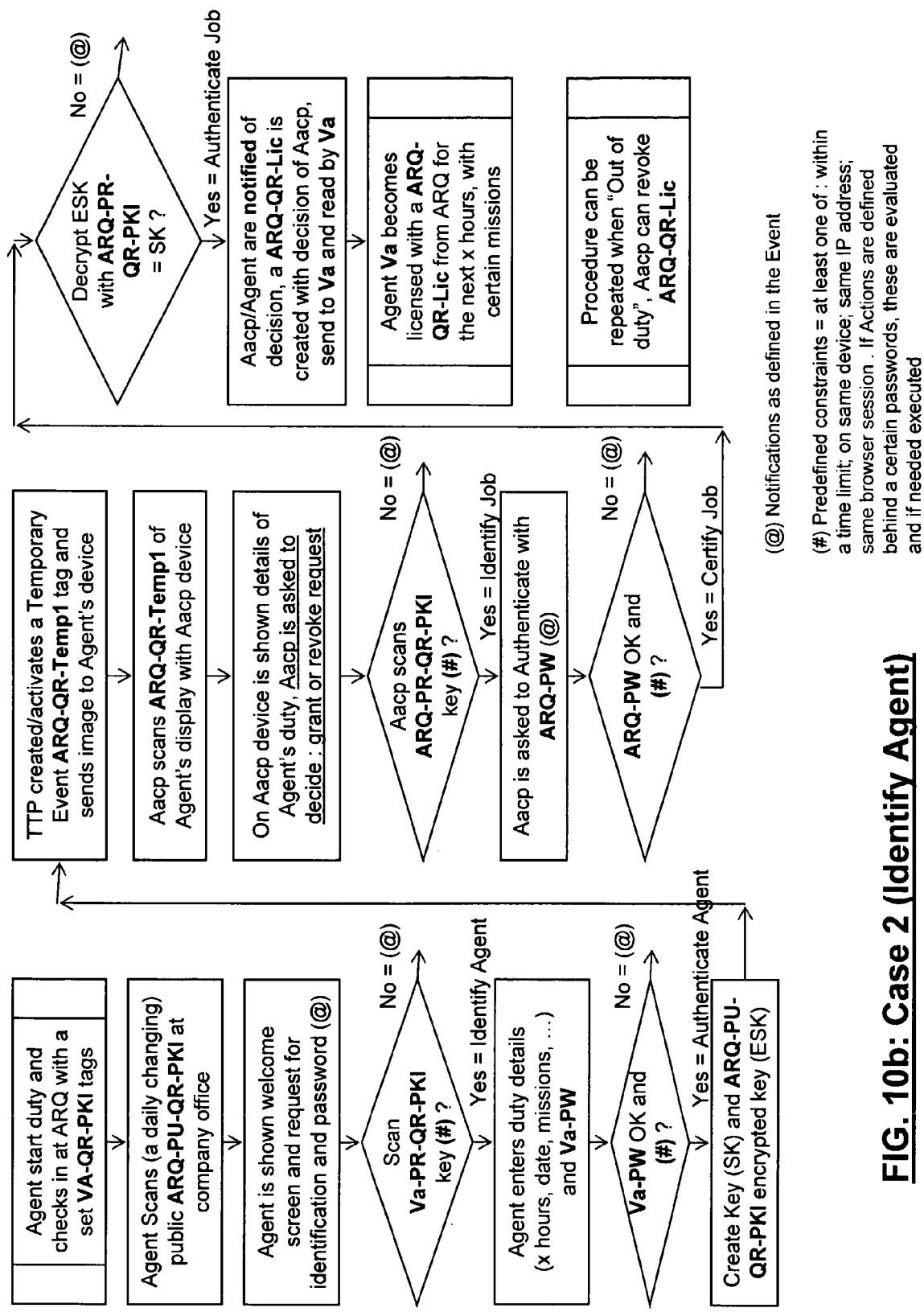
FIG. 10b: Case 2 (Identify Agent)

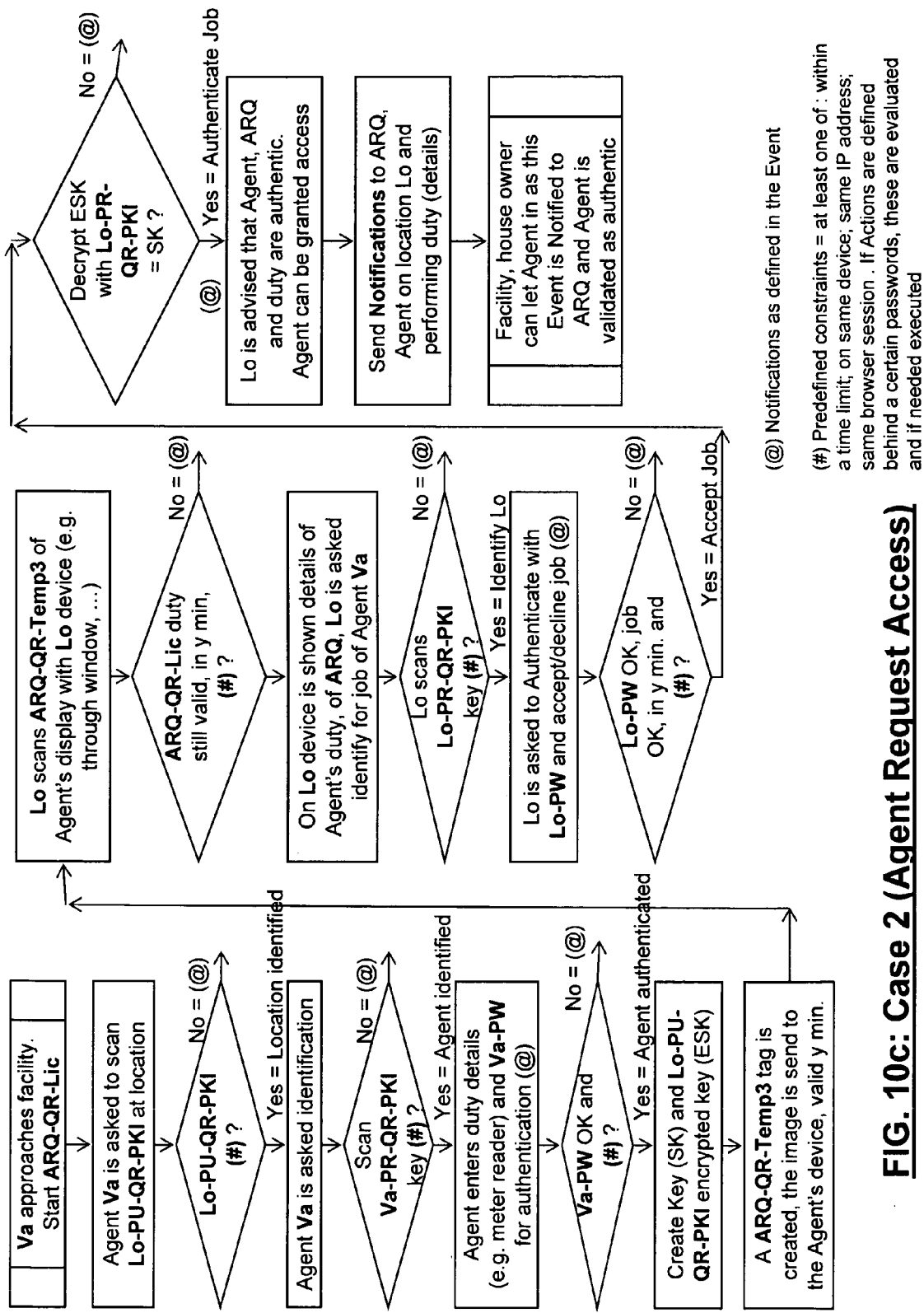
FIG. 10c: Case 2 (Agent Request Access)

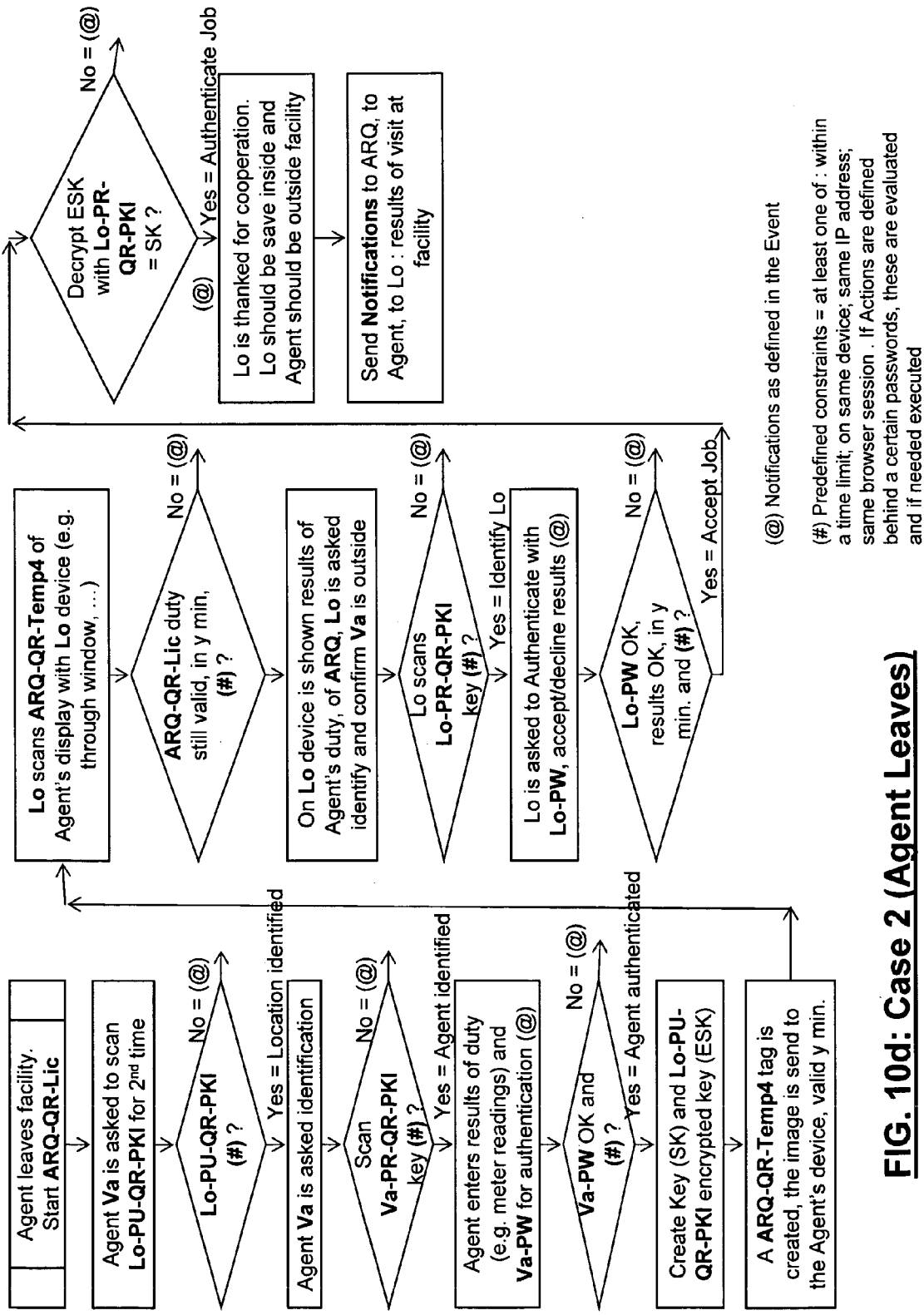
FIG. 10d: Case 2 (Agent Leaves)

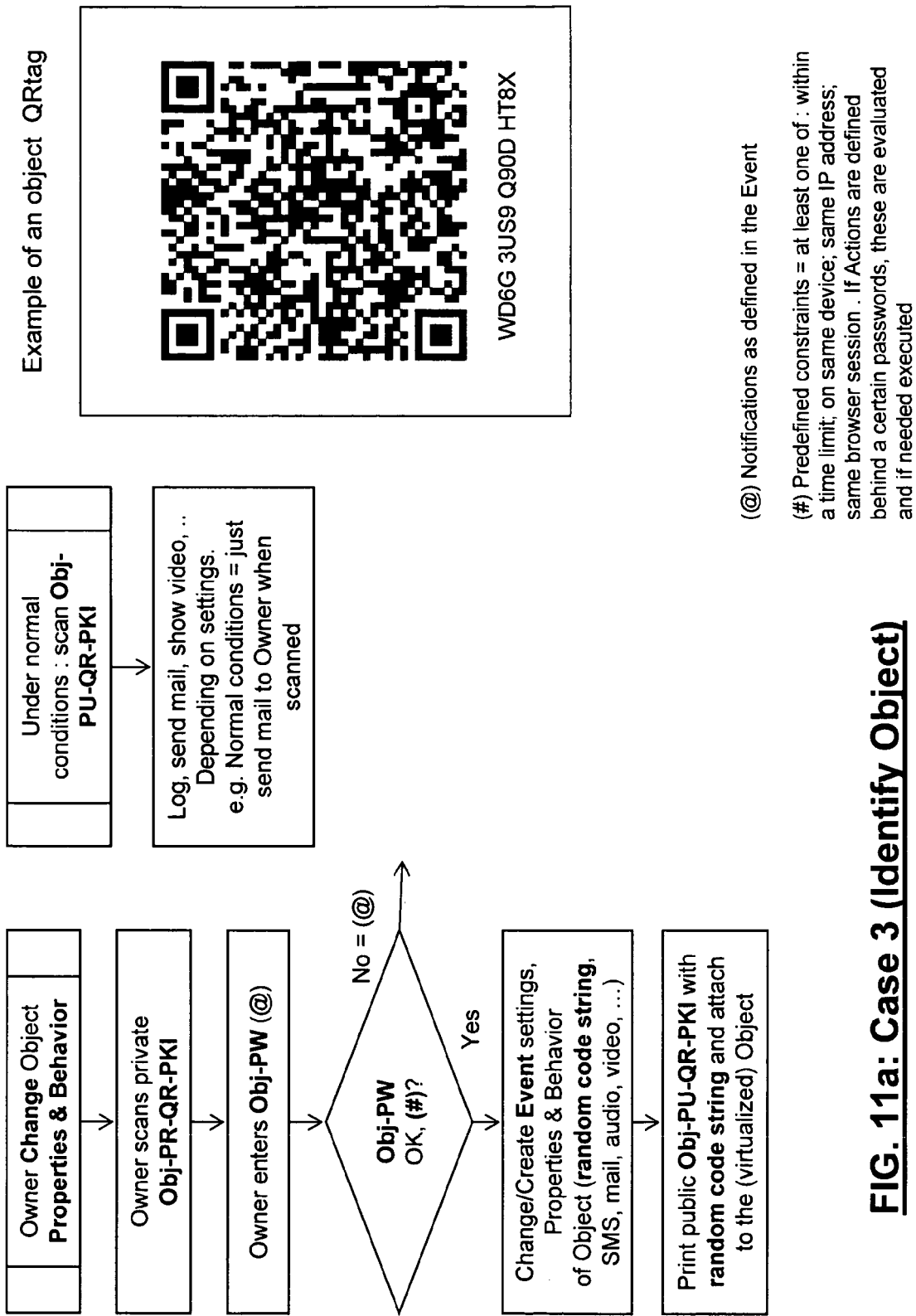
FIG. 11a: Case 3 (Identify Object)

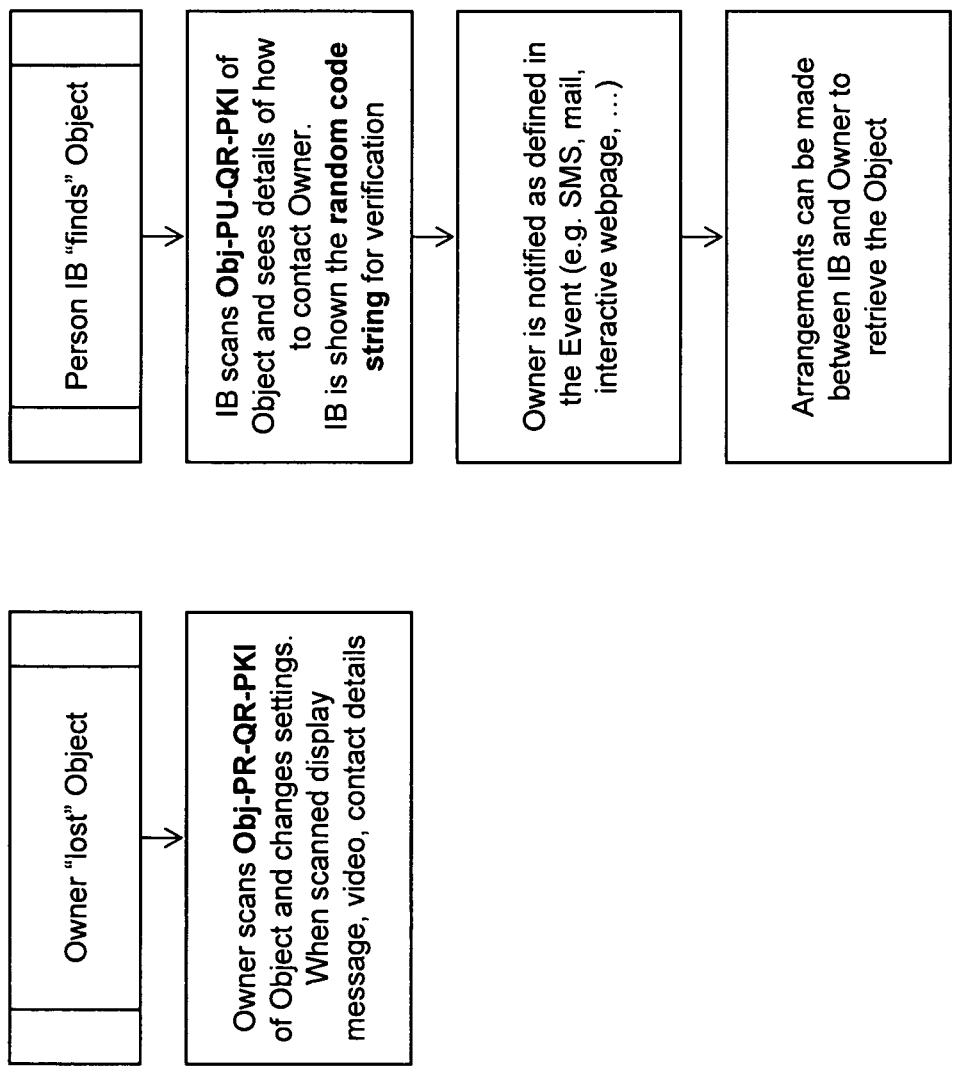
FIG. 11b: Case 3 (Retrieve lost Object)

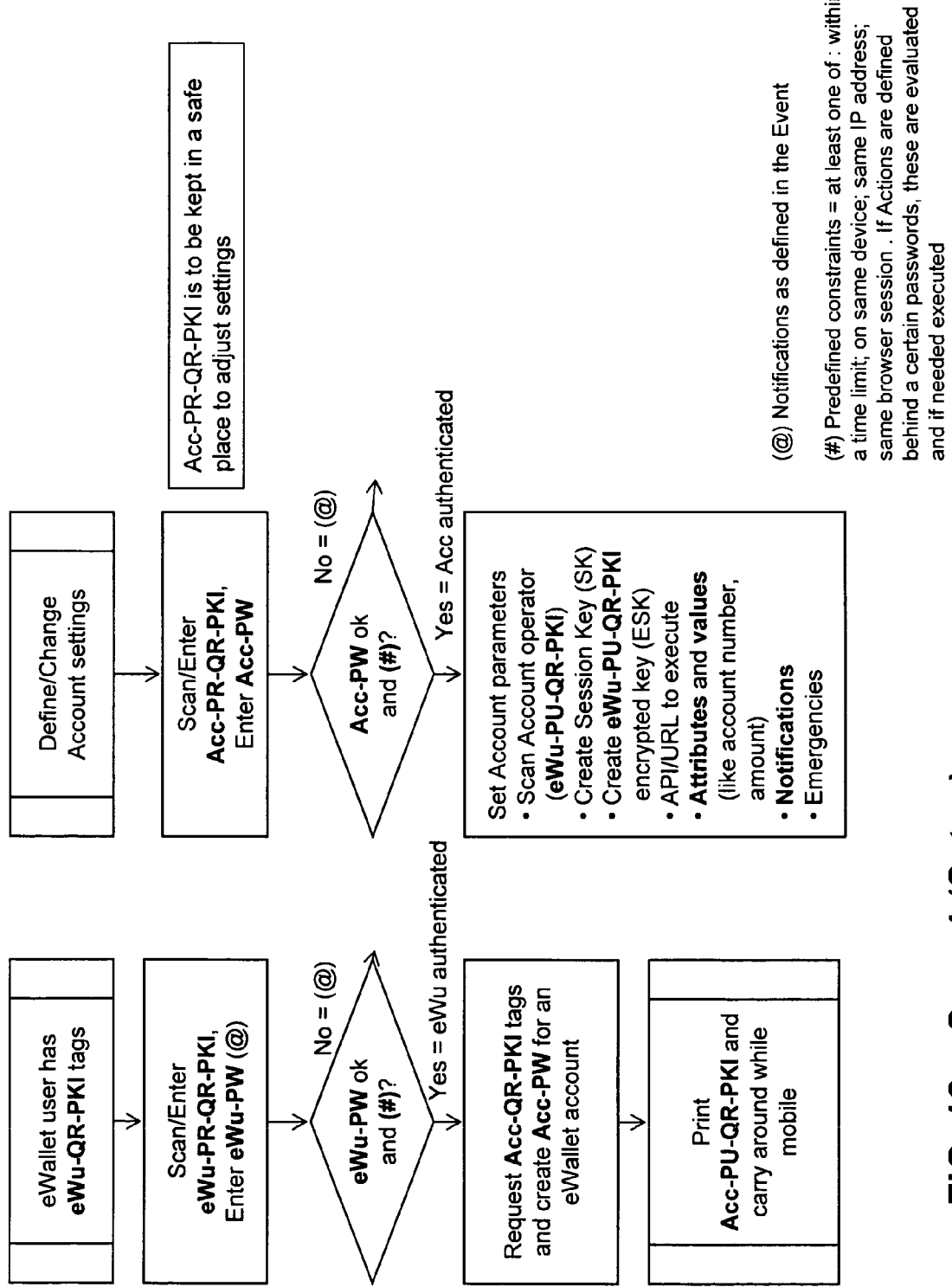
FIG. 12a: Case 4 (Setup)

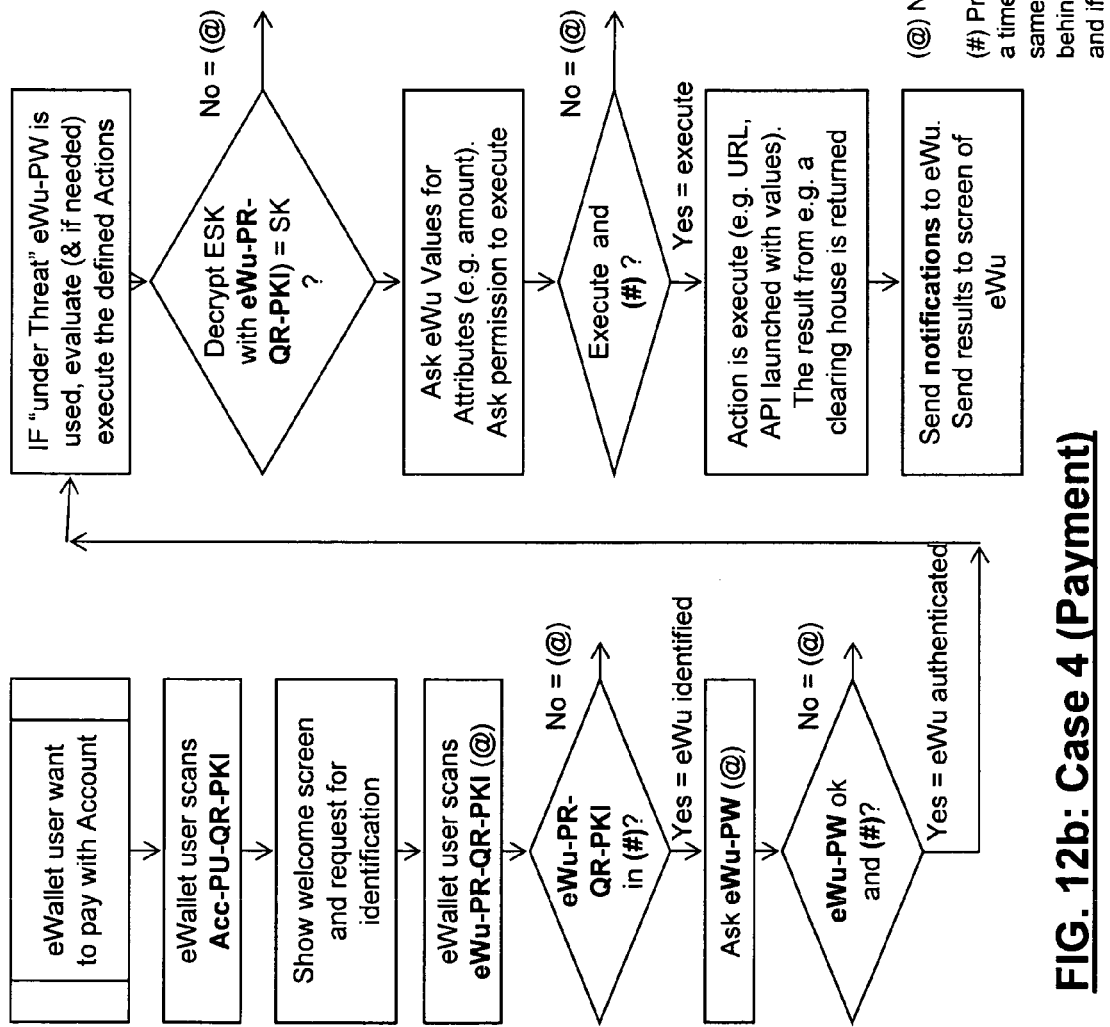
FIG. 12b: Case 4 (Payment)

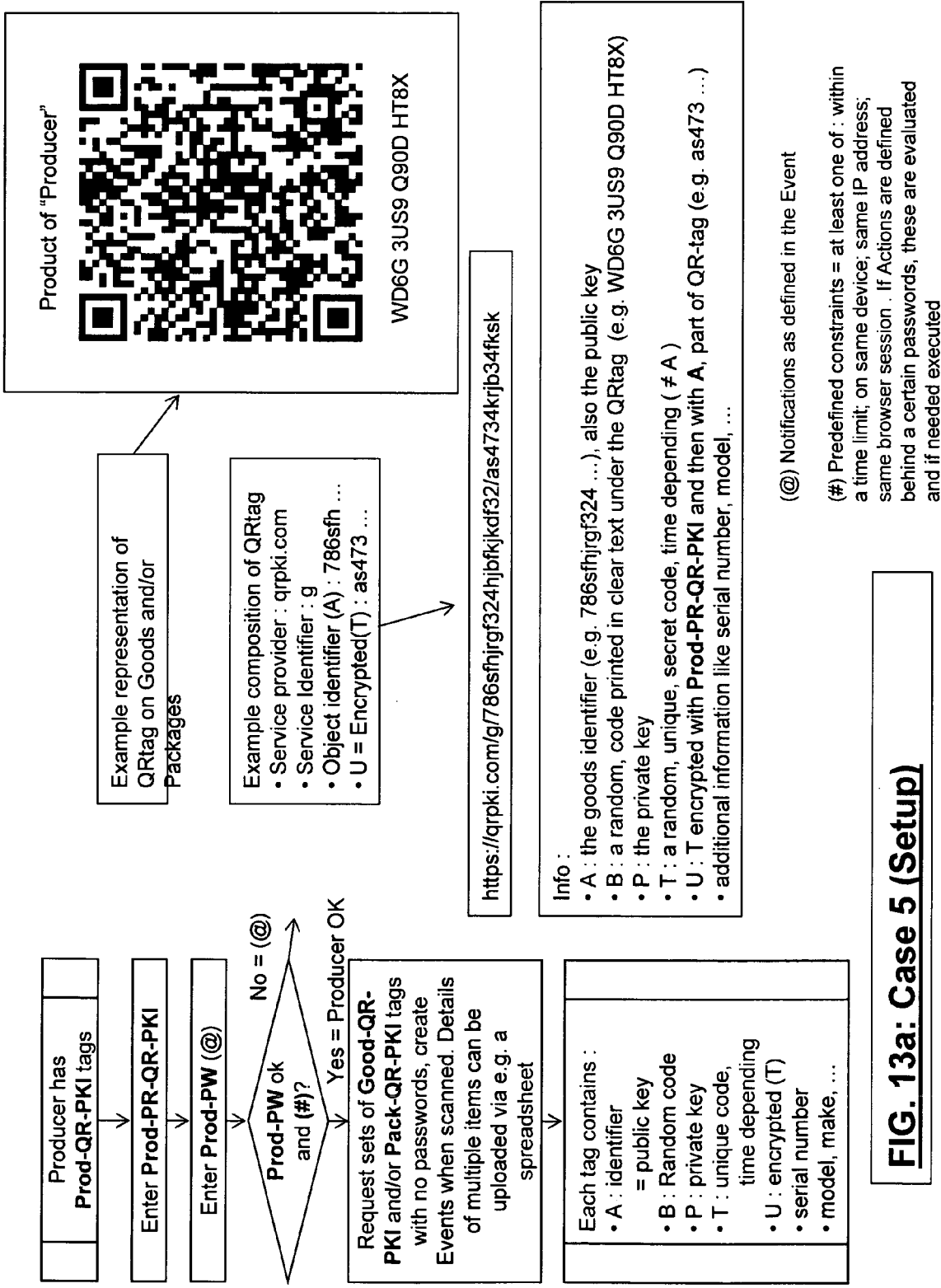
FIG. 13a: Case 5 (Setup)

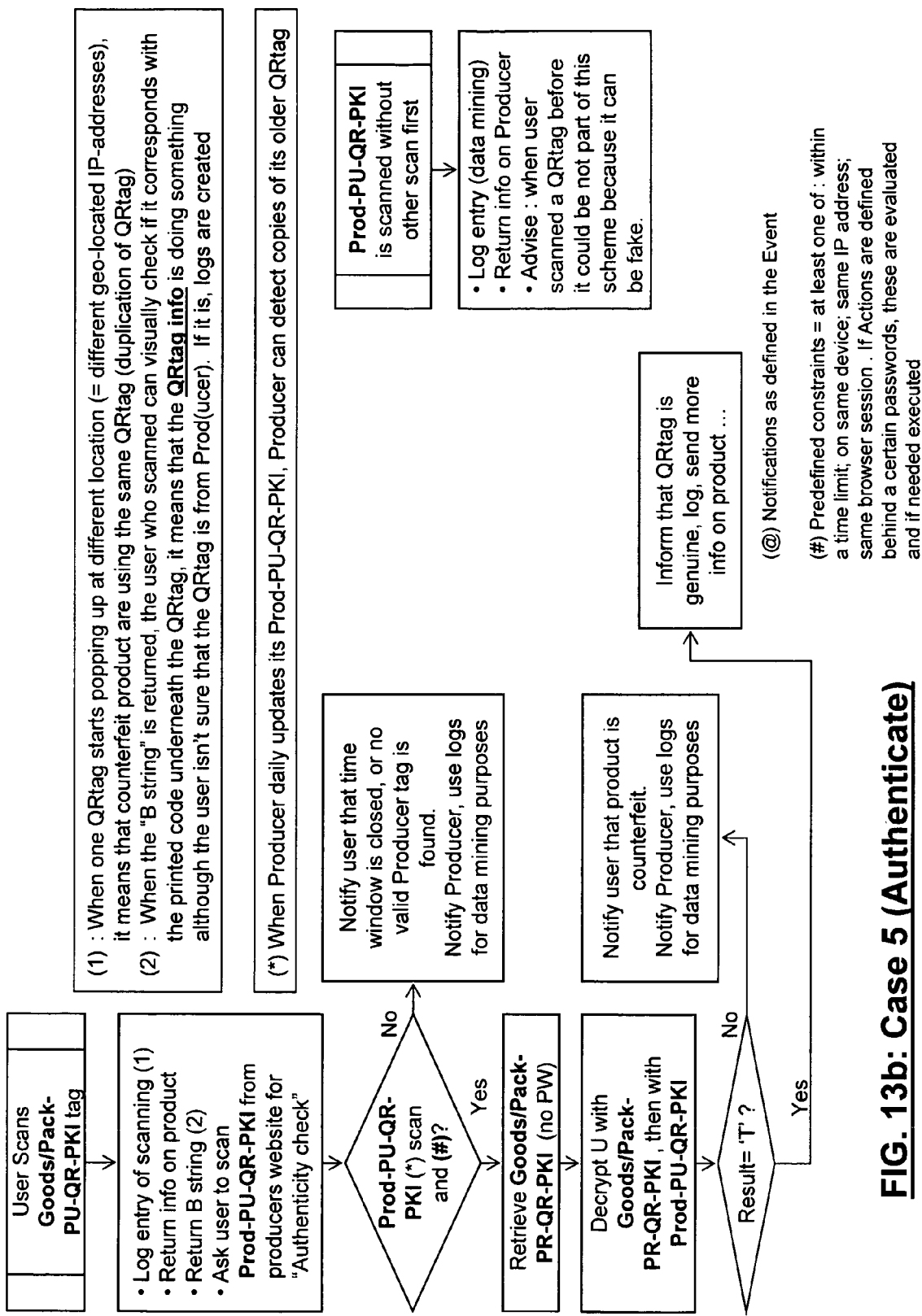
FIG. 13b: Case 5 (Authenticate)

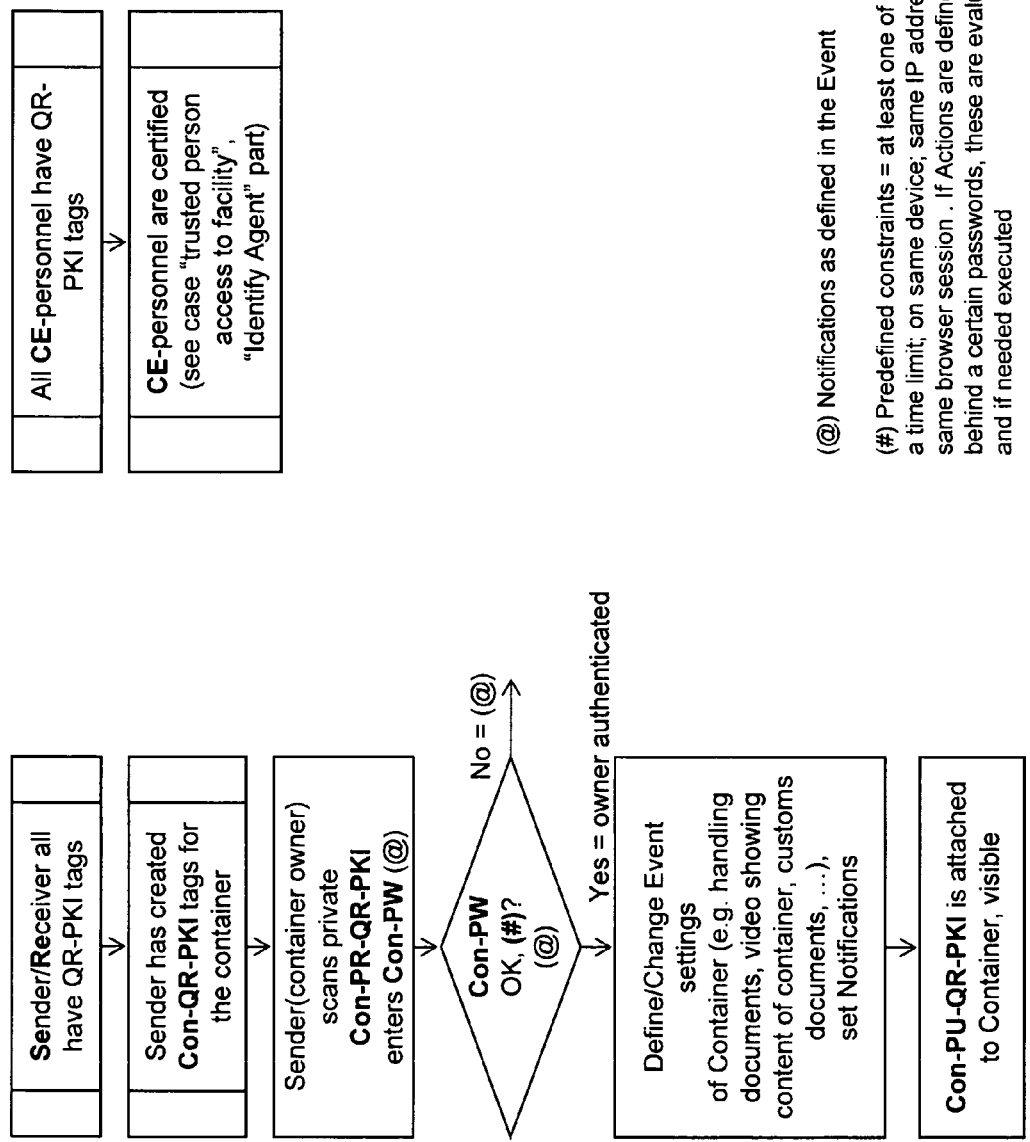
FIG. 14a: Case 6 (Setup)

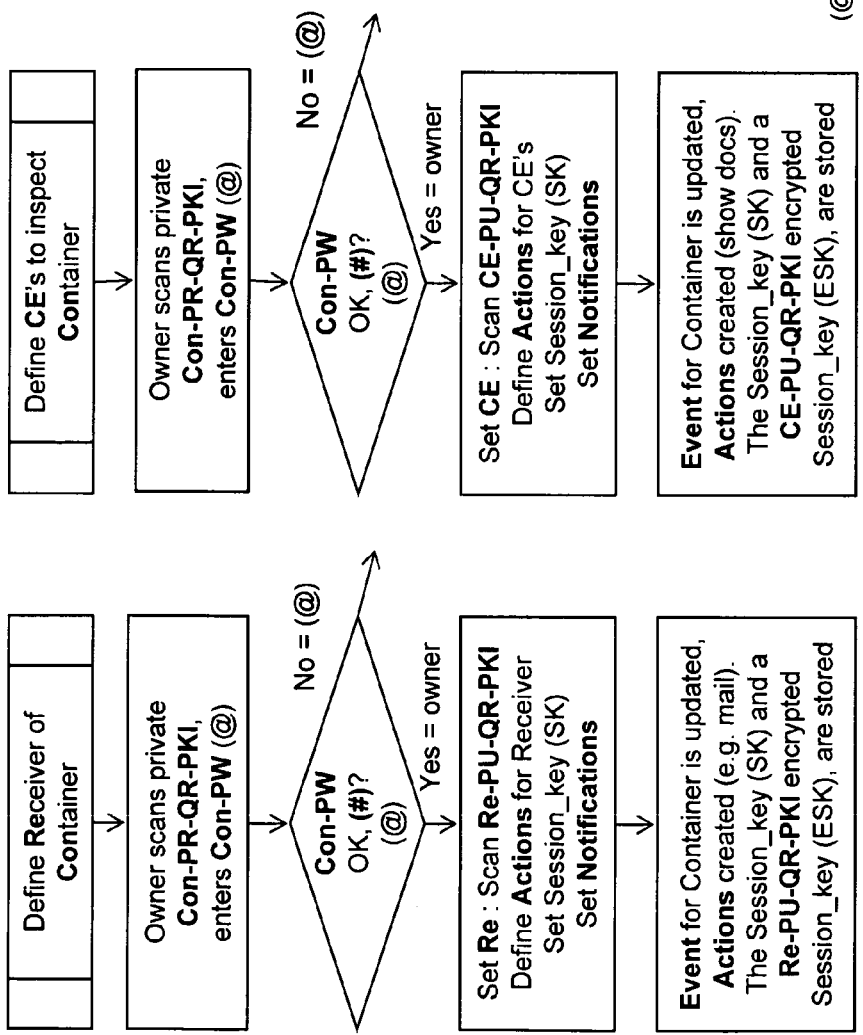
FIG. 14b: Case 6 (Identify)

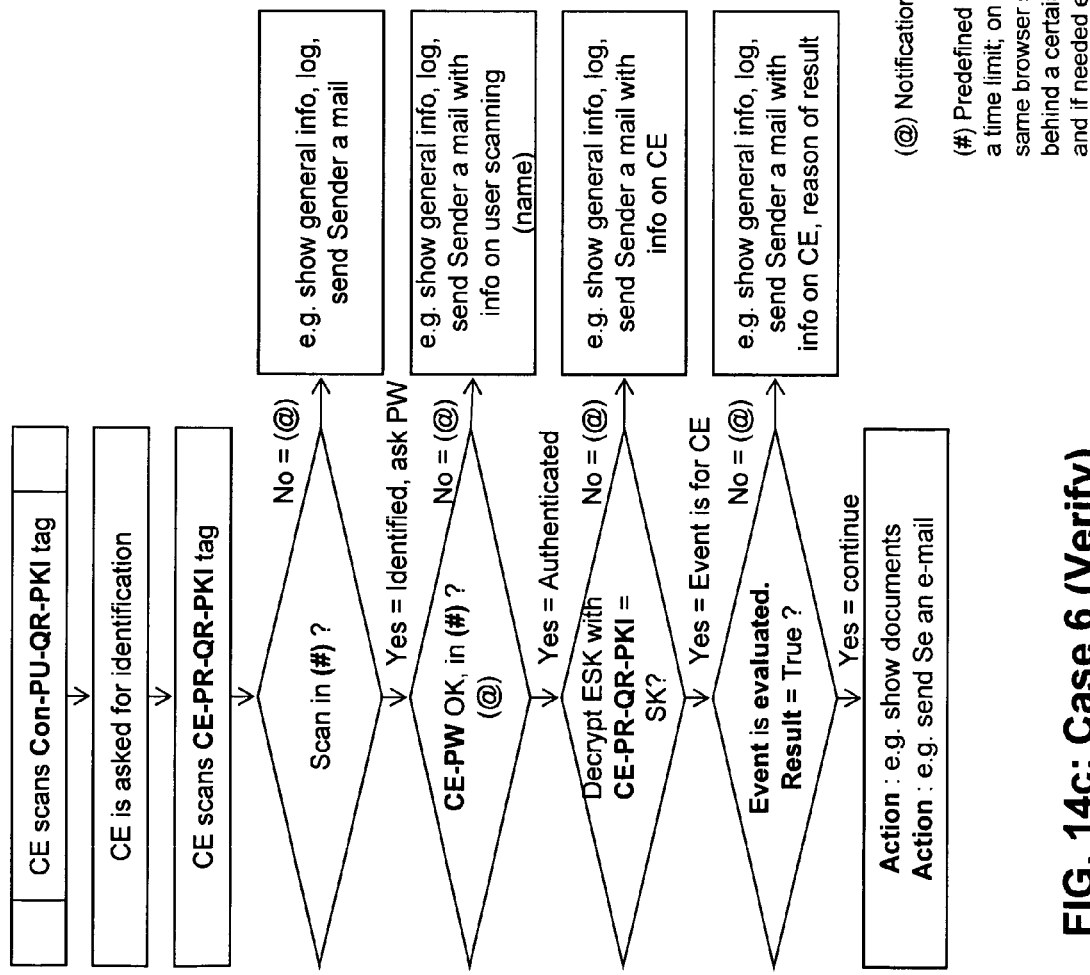
FIG. 14c: Case 6 (Verify)

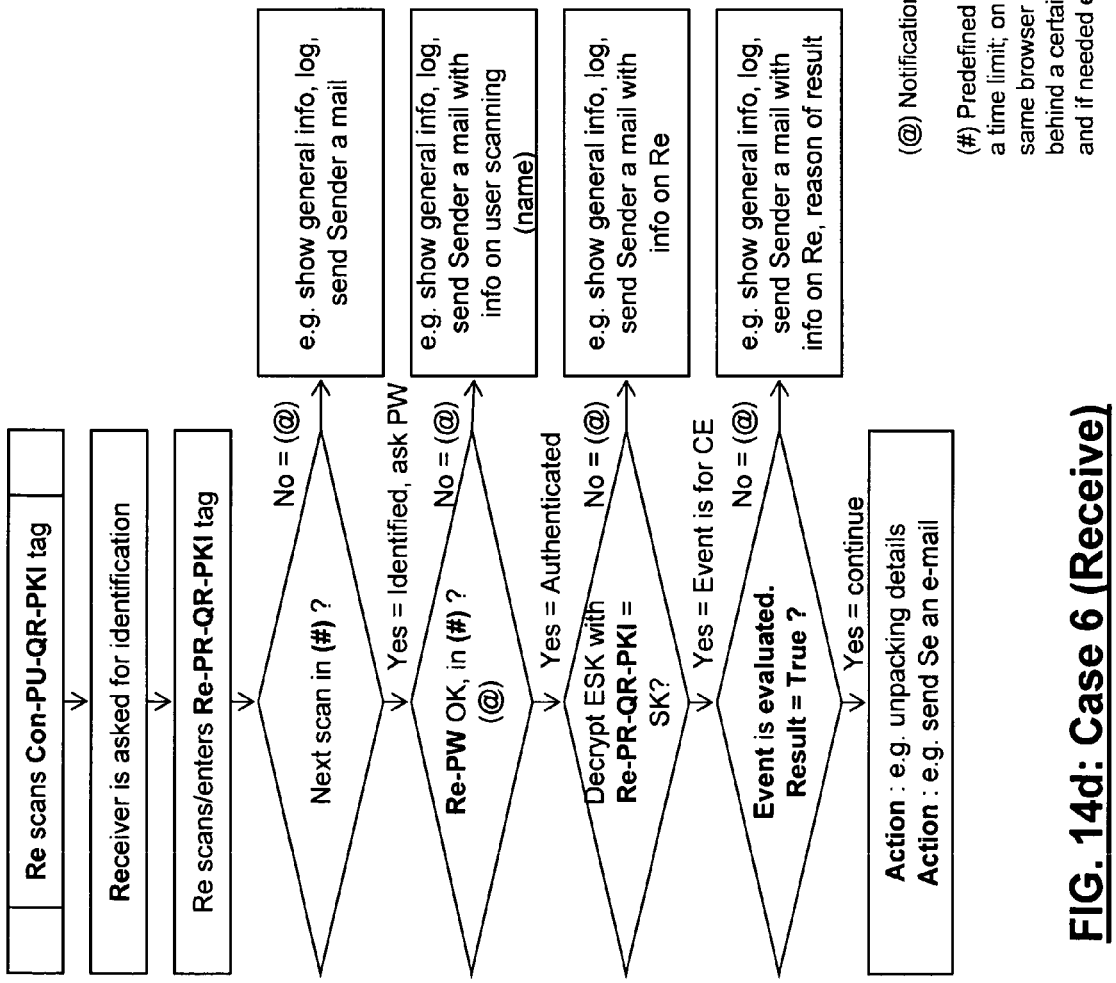
FIG. 14d: Case 6 (Receive)

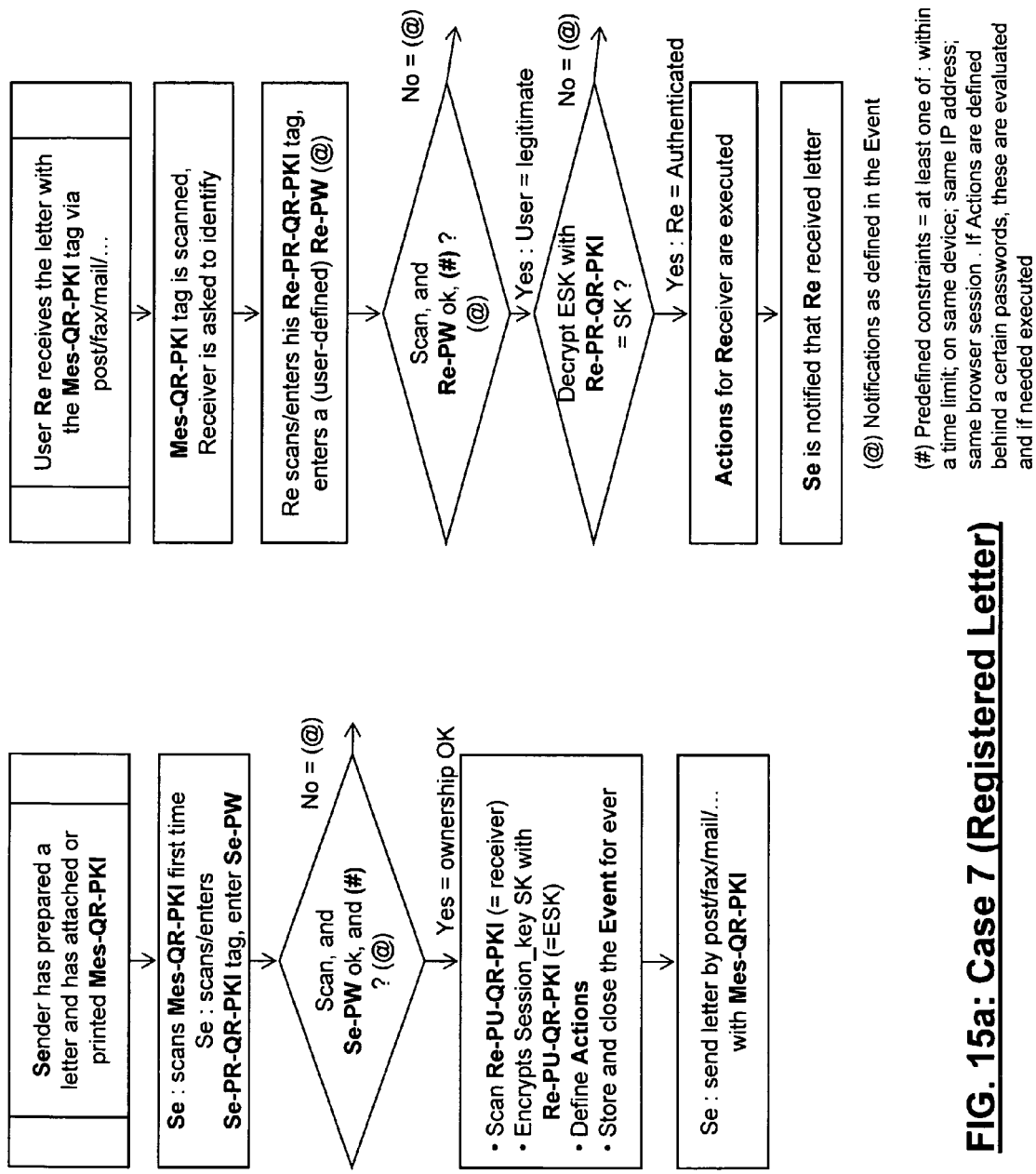
FIG. 15a: Case 7 (Registered Letter)

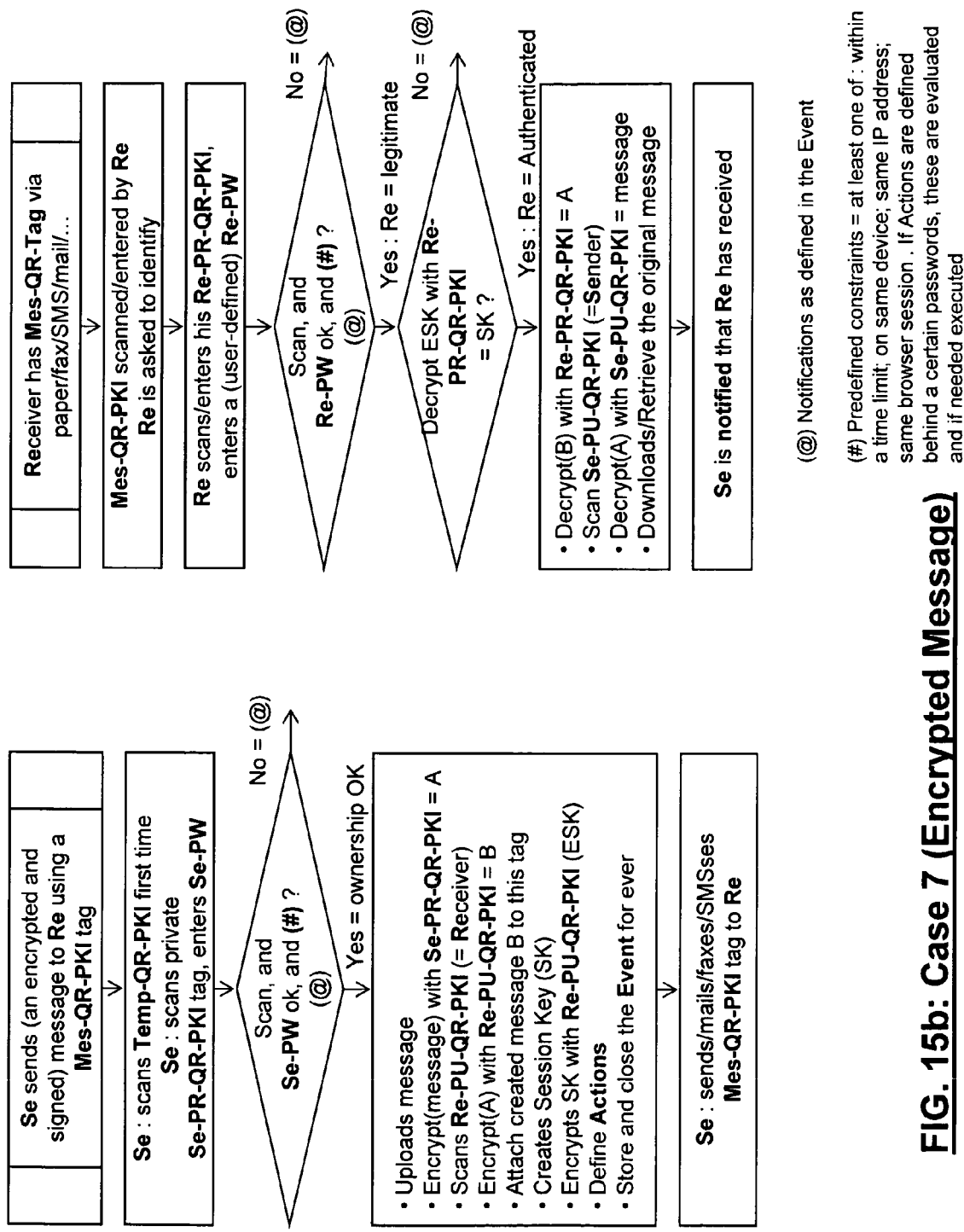
FIG. 15b: Case 7 (Encrypted Message)

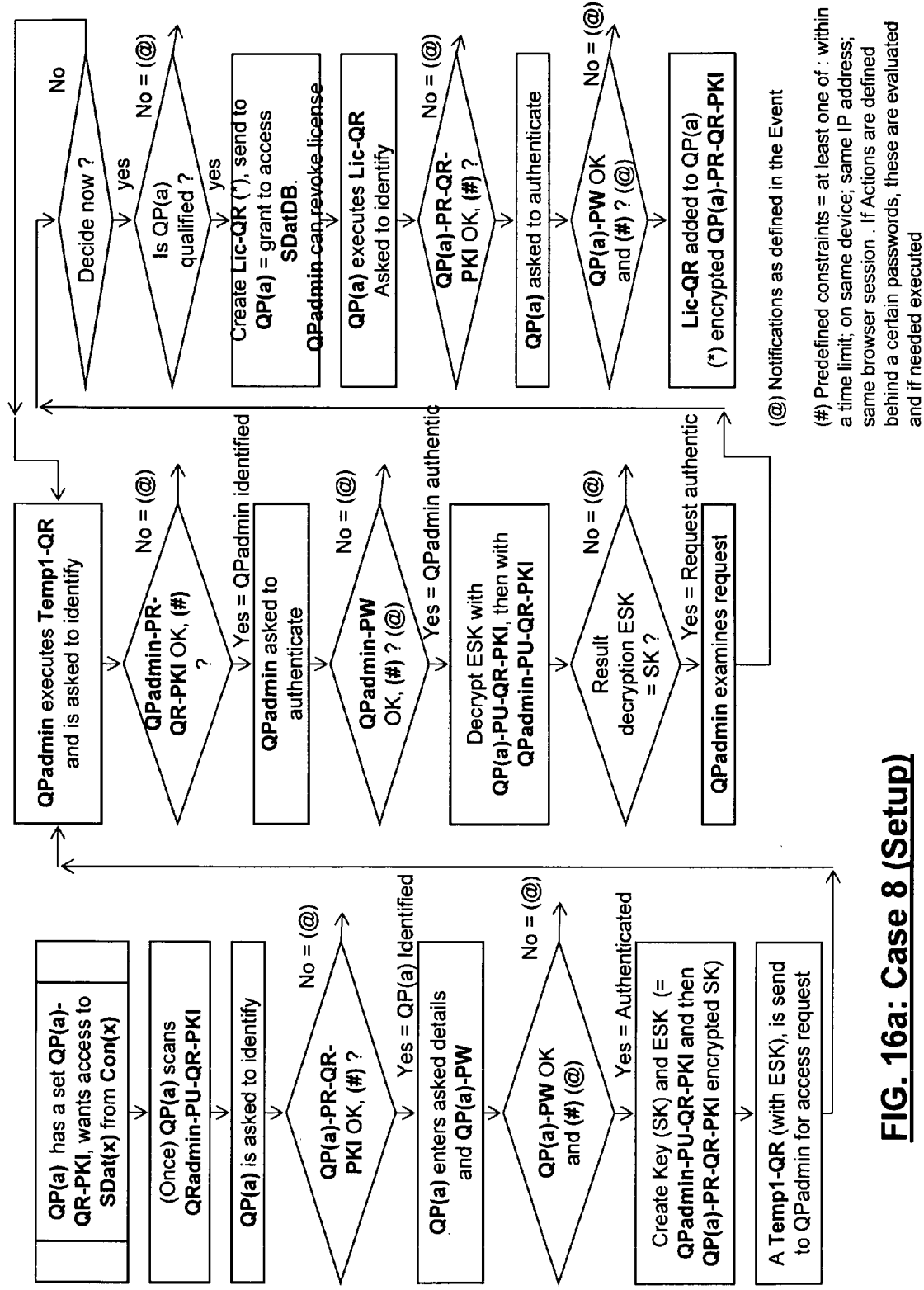
FIG. 16a: Case 8 (Setup)

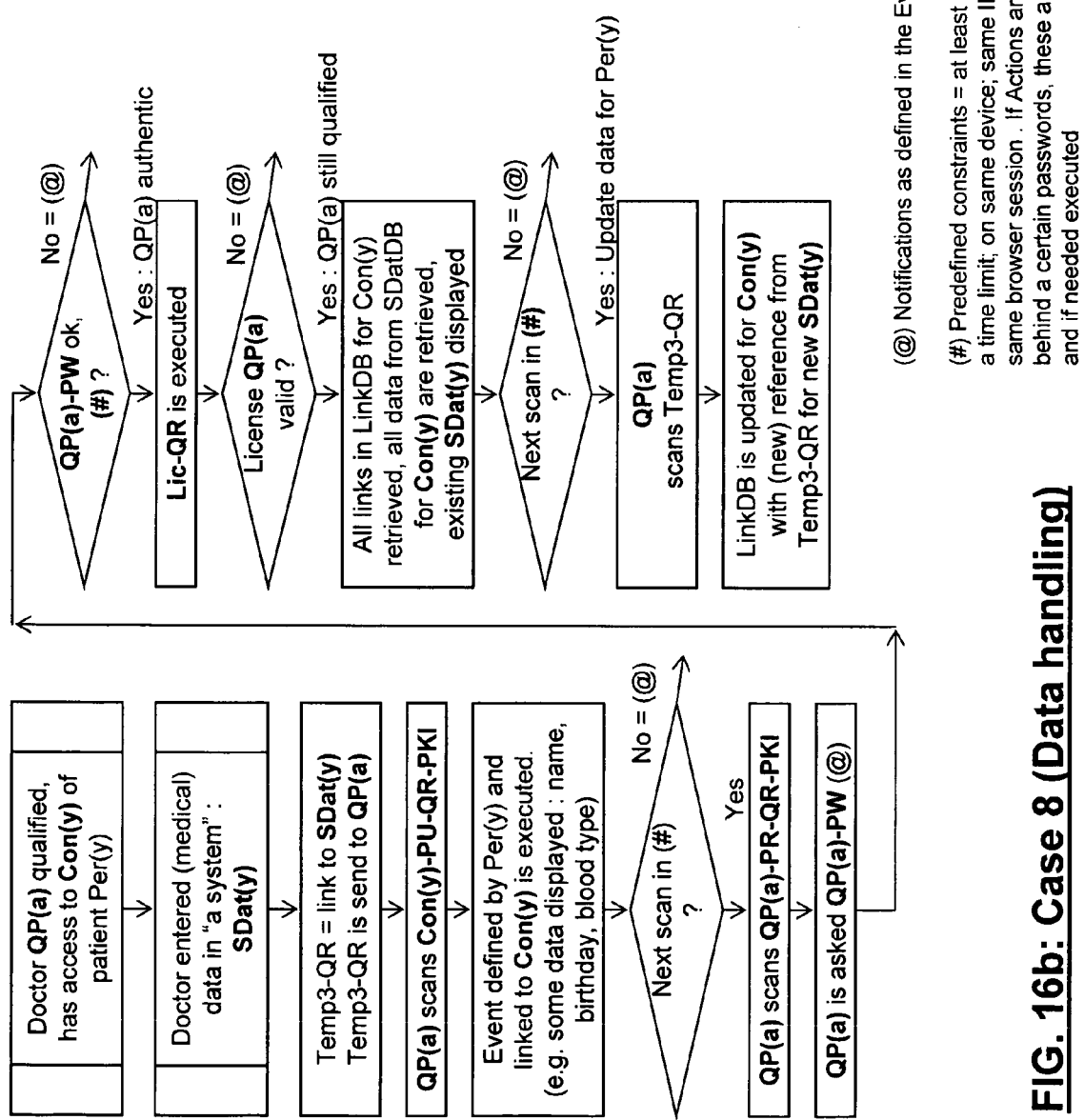
FIG. 16b: Case 8 (Data handling)

METHOD AND SYSTEM FOR AUTHENTICATING ENTITIES BY MEANS OF TERMINALS

FIELD OF THE INVENTION

The present invention is related to the field of methods and systems for authenticating entities by means of terminals.

BACKGROUND OF THE INVENTION

QR-codes are known. A QR-code (Quick Response code, ISO/IEC 18004:2006), herein also called QR-tag, is a specific matrix barcode (or two-dimensional code), readable by camera phones equipped with a QR barcode reader. The QR-code comprises coloured modules (mostly black) arranged in a square pattern on a white background. The information encoded can comprise an URL.

Many QR-code reading applications are known, which can be executed on smart phones and by means of which the user can scan a QR-code and is automatically directed to the web page at the URL encoded in the QR-code. This avoids that the user has to key in the URL on his smart phone in order to access the service behind a web page. All information in the QR-codes is parsed to the web page, making it easy for someone to parse complex alphanumerical string (e.g. codes) to a service without entering them manually.

A Public Key Infrastructure (PKI) is a combination of hardware and software used to issue and verify digital certificates, in particular public and private key pairs, for the purposes of security or authentication, for example to encrypt information or to authenticate users. PKI generally comprises a certification authority (CA) which generates PKI public and private key pairs to users, a registration authority (RA) where the users can register their PKI public and private key pairs and a validation authority (VA) which validates PKI public and private key pairs.

As PKI public and private keys can be relatively long strings of characters, it is not easy for users to enter these keys on their smart phone. When these keys are stored on the device, they can be misused when the smart phone is stolen, or information is copied from. As a result, PKI security solutions are nowadays not suitable for use on communication devices like smart phones.

In the paper '*Dynamic 2D-barcodes for multi-device web session migration including mobile phones*' (A. Alapetite, Personal and Ubiquitous computing, vol. 14, no. 1, April 2009, pp. 45-52) 2D barcodes or QR-codes are used to store sessions information in order to handover sessions from a web browser on one terminal to a web browser on another terminal.

In JP2008/048135 a two-dimensional code is used to transfer the results of an encryption of an (access) address with a private key to a terminal that can read and decode the two-dimensional code. Next that retrieved address is decrypted with the public key and can give access to that decrypted address.

Application JP2008/090512 discloses a two-dimensional code used to transfer information (an URL and a password) from a content display to a smart phone, sending that information to a content distribution system. That system calculates the correlation between URL and password and decides if the smart phone should receive (additional) information about the (items) in the content display associated with the two-dimensional code.

SUMMARY OF THE INVENTION

It is an aim of the present invention to provide a more user-friendly authentication system and method which is suitable for use on various kinds of terminals.

This aim is achieved according to the invention with the method/system showing the technical steps/features of the independent claims.

The invention makes use of sets of authentication codes in order to authenticate a particular entity. These authentication codes are in the proposed solution attached as properties of that particular entity. A set of authentication codes according to the invention is the combination of a private key container, a matching public key container and one or more "secrets", such as for example alphanumerical passwords or pin codes. As used herein, with 'container' is meant something that can contain a code and that is readable by means of an appropriate electronic device or terminal and wherein a key (private key, public key or any string of alphanumerical characters) can be embedded. In practice a container may be a QR-code, an RFID tag, a Near Field Communication tag etc. . . . . The private key container is generated from a first string comprising a domain name of an authentication server system, a PKI private key and possibly one or more parameters or identifiers, preferably together constituting a valid URL. The public key container is generated from a second string comprising same domain name of an authentication server system as in the first string), the matching PKI public key and possibly one or more parameters or identifiers, preferably together constituting a valid URL.

To make a secure transaction, it is considered to be safe if it comprises of something you have and something you know (e.g. a bankcard and a pin-code to retrieve money from your bank account, an e-mail address and a password to download information from a web site, an alarm system and a pin-code to disarm the surveillance). Therefore the present invention combines the PKI keys under the form of key containers (e.g. QR-codes) with one or more secrets (e.g. passwords). With the invention, it can be avoided that the PKI keys and the secrets are stored on the terminal. As a result, the authentication system and method is device independent and can assure a high degree of security.

The invention comprises an action definition procedure in which a first user can define a set of actions to be performed when the authentication server system receives the second string (encoded in the public key container) of one of the sets of authentication codes which has been provided to the first user. In order to trigger the action definition procedure, the first user reads (for example, by scanning) the private key container of his set of authentication codes by means of his terminal (optionally a mobile terminal). As a result of this reading operation, the authentication server system receives the first string which is encoded in the private key container (e.g. QR-code). The first user is then taken through the action definition procedure. He is first requested to enter the secret. The authentication server system then checks if the secret and the first string received earlier belong to the same set of authentication codes and if they meet predefined constraints (e.g. were they received within a predefined time-frame from each other and from the same terminal, e.g. by means of checking IP-address, session id, etc.). If the check returns a positive result, the first user is then requested to define the set of actions which are to be performed upon receipt of the second string (encoded in the public key container) belonging to the same set of authentication codes on the authentication server system.

The advantages of the invention are the following. The use of containers like e.g. QR-codes is advantageous since nowadays terminals such as smart phones are equipped with a camera and as such are able to read these QR-codes. QR-reading software is freely available, so that users can use their smart phones to visit web sites by simply scanning QR-codes. So, no dedicated user devices are necessary to implement the invention. The invention uses in one embodiment QR-codes containing the PKI public and private keys, but is nonetheless secure since the set of authentication codes further comprises one or more secrets which are only known to the user. Similarly, RFID tags can be used as containers according to the invention, or even text messages (SMS). For RFID tags in general, a string can be programmed into a tag. On activation of that tag, the string is sent out encoded in a radio signal. A device capable of capturing that radio signal (i.e. a RFID reading device, e.g. a terminal equipped with an RFID reading device) can extract the string from the radio signal. Next that string can be parsed to the Internet (by means of a browser application on the terminal) and the solution according to the invention can be applied. NFC tags (a subdivision of RFID tags, but with possibly two directional communication) can also be used in the same manner. When questioned/activated by a suitable reading device, the NFC tags can return a string that can be submitted to the Internet and the solution according to the invention can be applied. Another example is text messaging (using SMS): text messages can contain a string and are transmittable between various kinds of terminals. If the receiving terminal is equipped with a procedure for parsing a string, received in such a text message, to the Internet (by means of a browser application on the terminal), the methods according to the present invention can be used. In general, any container capable of transporting an alphanumerical string and compatible reading device capable of reading the string from the container and parsing that string to the Internet, can be used to carry out the method as described in the present invention. The invention is further made secure by requiring the predefined constraints, which can for example be a predefined time frame within which subsequent operations need to occur and/or requiring that the subsequent operations come from the same terminal. Optionally, the security can be further enhanced by using https connections to send the information over the internet to the authentication server system.

In preferred embodiments of the invention, multiple consecutive reading operations can be combined, on the same terminal device, within a predefined time frame, of public key containers and/or private key containers in combination with their secrets and this from keys belonging to different entities. By such combinations a wide variety of action schemes can be created and/or executed.

In preferred embodiments of the invention, each set of authentication codes comprises additional user-definable secrets and the action definition procedure comprises the step of associating a predefined procedure to each of the additional user-definable secrets. Upon receiving one of the additional user-definable secrets on the authentication server system, the associated predefined procedure is then performed. This can be used for example to set a password a user can enter when under threat, the associated procedure then being for example to notify emergency services. Another example is to create a user-definable secret which can be seen as a 'negative' result, thus for example only notifying emergency services, but not performing an action like opening a door or transferring information or transferring e-money.

In preferred embodiments of the invention, the action definition procedure comprises the further steps of creating a temporary key in the form of a container for the first user, said temporary key having a predetermined validity term, and defining a set of actions which are to be performed upon receipt of the temporary key on the authentication server system. This container can for example be generated from respectively a string comprising a domain name of the authentication server system and a string of alphanumerical characters and one or more delimiters in between, preferably constituting a valid URL.

In preferred embodiments of the invention an entity set of authentication codes can be assigned to the first user, said entity set being one of said sets of authentication codes of which the public key container is provided for attachment to, association with or virtual representation of an entity of the first user. This entity set can for example be used to authenticate lost objects which are found: by attaching the public key container to an object, anyone who finds it can simply read this public-key container to trigger a set of actions by which for example the owner is notified, the finder is notified who the owner is or where the object has to be taken to, etc. This entity set can for example also be used to secure a location, e.g. an agent visiting a location first has to read the public key container attached to that location and perform an authentication procedure before he is allowed to enter the premises. For handing over entities, ownership of the entity can be transferred from the set of authentication codes of the first user to the set of authentications codes of the second user.

In preferred embodiments of the invention, the definition of the set of actions comprises the steps of: requesting the first user to define a set of logical expressions with conditions to be evaluated upon the receipt of the second string on the authentication server system, and to define a first set of actions to be performed if the evaluation of the logical expression returns "true" and a second set of actions to be performed if the evaluation of the logical expression returns "false". These logical expressions can be built with definable attributes (variables) that can be given a value upon definition or upon evaluation, and predefined function-calls on the authentication server system. The logical expression may contain computations and encryptions in which user defined values and/or properties are combined/encrypted with PKI keys or other sets of authentication codes.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, in which:

FIG. 9 shows the application of the invention to a first case.

FIG. 10 shows the application of the invention to a second case.

FIG. 11 shows the application of the invention to a third case.

FIG. 12 shows the application of the invention to a fourth case.

FIG. 13 shows the application of the invention to a fifth case.

FIG. 14 shows the application of the invention to a sixth case.

FIG. 15 shows the application of the invention to a seventh case.

FIG. 16 shows the application of the invention to an eighth case.

DETAILED DESCRIPTION OF ILLUSTRATIVE EMBODIMENTS

Figure 1:
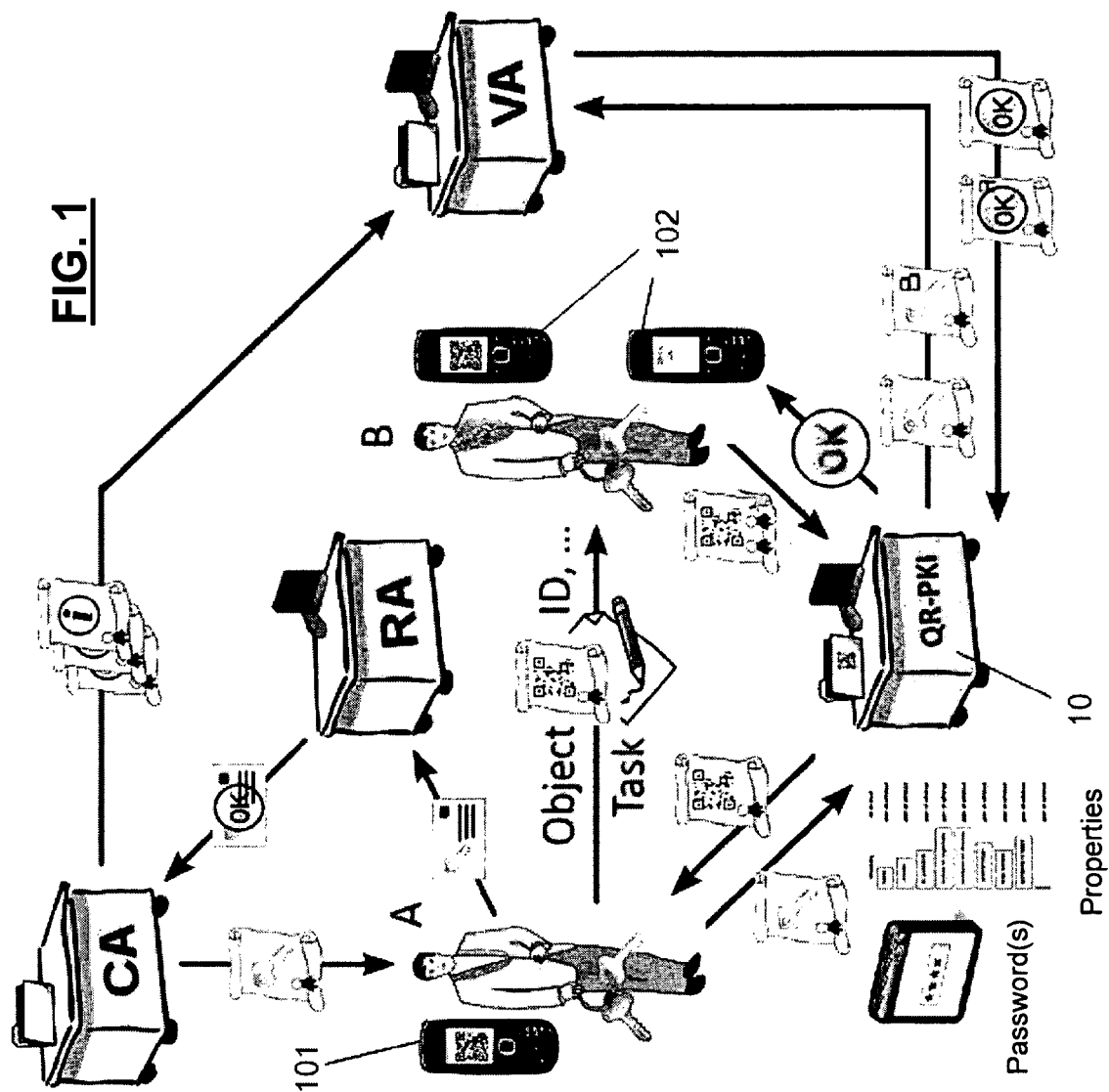
FIG. 1 represents an overview of a preferred embodiment of an authentication system according to the invention.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The invention relates to a method and system to provide authentication of an entity by using terminals, preferably mobile terminals. A first person A stores irrefutable "event" information about an entity (e.g. an object, human, animal, plant, place, task, service, state, . . . ) to be queried by a second person B, who can then can act upon the retrieved "event result". The first person A can be notified when a query is executed by a second person. Parameters which are sent can be e.g. time, location, person, IP-address, device, or other. An example is to make absolutely sure that a police officer calling at a home is indeed a legitimate police officer.

The invention makes use of containers to represent keys of a PKI system, generating 'PKI tags'. Use can be made of existing PKI schemes, existing Certification Authority (CA), translated into a container. A container is to be construed as a kind of data structure that carries a key (i.e. private or public key) of the PKI system. Practical implementations of a container can for example be a QR-code, a RF-ID tag or a NFC tag, or even a textmessage (SMS).

The invention further uses simple, common (mobile) terminals, e.g. smart phones which may be equipped with a camera, RFID reading device, or any other means able to read the data in the container and parse that data to the system, i.e. keys are not used or interpreted by the terminal. "Events" are created by combining several read operations performed on the container data within a predefined time frame. These events can later be executed by reading the container data that will be evaluated by the system and if needed, execute action defined in the event.

As used herein, entities can for example be objects, persons, tasks, places, events, transactions or states, or anything else that can be defined and represented by the user. In the system, an entity is defined by one or more alphanumerical strings—to be used as encryption keys, part of the visual representation in the form of tags to handle those keys easily in daily life—and one or more secrets, also alphanumerical strings only known to the user defining the entity. The basic principle is to use private and public keys of a PKI (public key infrastructure), but also other codes (alphanumerical string) can be used (e.g. for temporally keys). When technology for other tag readings becomes more generally available, tags wherein the keys are represented using techniques like e.g. RFID-codes or near-field communication (NFC) will also be available at large scale.

Services can be one or a combination of services like a notification from an entity or combination of entities, a secure authentication of an entity or combination of entities, an action derived from an entity or combination of entities. Notifications can be defined as sending or displaying a message (e.g. an e-mail, a SMS). Authentications can be defined as making sure the entity is authentic according to the rules the owner of the entity has defined (e.g. the document is authentic from the sender). Actions can be defined as any change in state of a device, object or situation that can be defined in the system and executed via electronic messaging from the system (e.g. SMS, connection to a CPU, relay with IP-address etc. . . . ). Services and actions are selected as predefined Functions of the entity in the system. Attributes (variables) can be created and given a Value, logical Equations can be created using these Attributes and Functions. When an entity is activated—by parsing one of its PKI-keys to the system— the defined conditional rules of the Equation are evaluated, depending on the logical result, the defined services or actions for that result are executed.

The way the invention is used comprises the consecutive reading, within a defined time frame, of one or more tags and, if required, entering one or more secrets on the communication device, to activate or to define the service depending on which type of key is read first. Two preferred embodiments are:

1) when a private key is read first, the corresponding password is asked for. When the password checks to be correct, the entity can be (re)defined, so properties, attributed, services, actions, variables and/or equations can be changed.
2) when a public key or a temporary key is read first, then a consecutive read of another tag can be required to evaluate the triggering of the defined action or to activate a temporary key.

The nature of tags in general is that the name of the service provider (a URL including a domain name) and one of the keys (private, public, temporary) is included in the tag, optional parameters (delimited by e.g. "/") can also passed on when the information is submitted to the string encoded in the tag. Some of that information is used to identify parameters like IP-address, session id, time/date, by them evaluating if the consecutive scans come from the same communication device. Besides the evaluation and possible execution of the predefined actions and services, the user can be notified on the communication device and the owner/creator of the tag can be notified as well upon execution.

The security schemes used to populate the public and private keys in the PKI system, are keys according to a public key infrastructure or PKI. Other keys can be any secret code that is represented by a string of alphanumerical characters. Secrets can be simple alphanumerical passwords entered on the communication device or generated and entered by any other means like smartcards, keys or other devices. In case QR codes are used as container, QR-PKI-tags are applied, which are basically a subset of QR-tags in general and comprised of a service URL (e.g. https://qr-pki.com or https://qrpki.com, but also their http counterpart), a delimiter (e.g. "/"), the key in alphanumerical form and possibly some extra delimiters and extra parameters can be mixed in the QR-PKI-tag.

Communication devices used according to the invention can in an advantageous embodiment be mobile terminals such as smart phones, laptops with wireless connectivity and the like, but also any other communication device connected in some way to the Internet, equipped with a reading device for the used container, like e.g. a camera, able to decode QR-tags and send the result to a browser, will qualify (e.g. an Internet connected PC with webcam, a smart phone, a GSM capable of connecting to the Internet and equipped with a camera, a tablet PC with built-in camera and Internet connection, . . . ). The communication device itself is interchangeable as it does not contain any secrets, codes or other information/data related to the system or method. The communication device is just used by the owner of the device for reading and decoding tags, to communicate bidirectionally between the owner/holder of the communication device and the said service for that particular entity. When images of tags are sent to the communication device's display, this display can be read by yet another communication device, interpreting the tag, thus passing information from one device to the other device without being directly in connection with each other. That way, a sequence of Events can be triggered between multiple participants using communication devices passing on information via QR-tags by using display and camera of the communication devices.

By entering/reading/scanning one or more predefined data containers (e.g. QR-tags) and associated secrets within a (pre) defined time frame on the same communication device, the associated predefined service(s) is/are performed. The result is shown on the display of the used communication device, informing the owner, or querying the device owner to enter more input (e.g. by scanning yet another data container, by entering passwords, by entering other data).

The proposed method and system is a practical solution to use codes and keys like PKI on (mobile) communications devices, it is a simple way to evaluate and execute secure services while mobile, without storing secrets on the used communication device.

In the embodiment shown in FIG. 1, wherein QR-codes are employed as containers, the "QR-PKI" system comprises a Certification Authority (CA) to generate PKI-key-pairs, a Registration Authority (RA) to register PKI-key-pairs, a Validation Authority (VA) to validate PKI-keys and a new QR-PKI service (10) to transform PKI keys into QR-codes and keep track of additional data (e.g. attributes, passwords, actions, . . . ). Depending on the setup, the CA, RA, VA and the QR-PKI service can be one or multiple entities, called Trusted Third Parties (=TTP). A TTP can perform services and functions (some examples below)

Create QR-PKI sets: PKI-key-pairs+passwords+attributes (see FIG. 3)
Convert PKI-keys into QR-codes and vice-versa
Create events by (reading) one QR-PKI key or linking two or more QR-PKI keys together Update, compare, certify and keep a database of QR-PKI sets Combine QR-PKI sets in a logical way (expert system)

Evaluate equations built with Attributes and Values

Give out a "confirmed" or "negative" report upon challenging

Communicate with mobile terminals via the Internet

Log all transactions and send e-mails with status updates

"Charge" a small amount of money for the QR-PKI service from an account that has been setup The CA, RA, VA and QR-PKI together form 'an authentication server system' according to the invention, which means that the CA, RA, VA and QR-PKI can be implemented on one and the same server or on two or more separate servers. In the preferred embodiment, the QR-PKI is implemented on a separate server, so that use can be made of any existing PKI in combination with the QR-PKI server 10.

Figure 5:
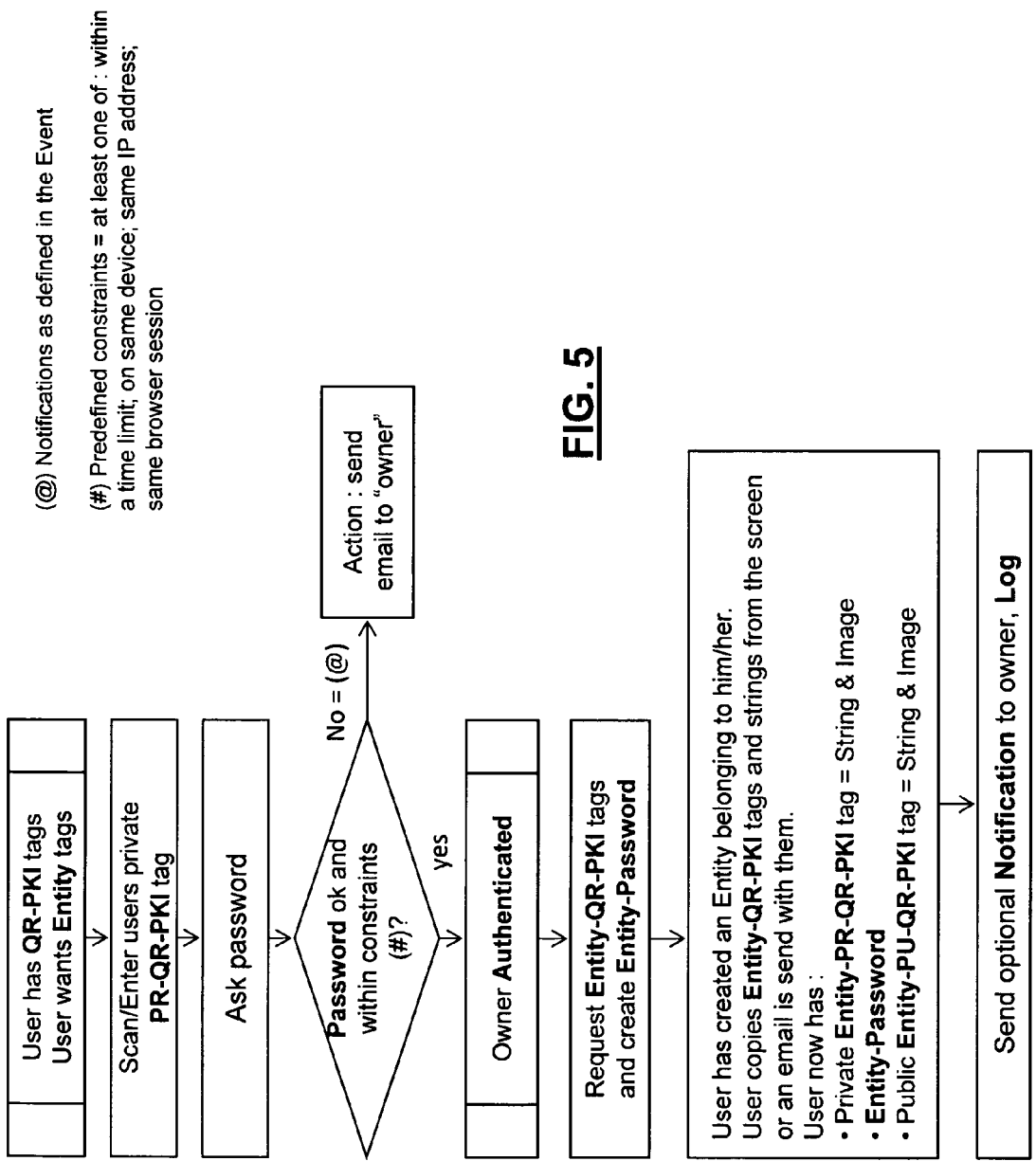
FIG. 5 represents an example of a procedure according to the invention of creating/assigning an entity set of authentication codes to a user.
Figure 7:
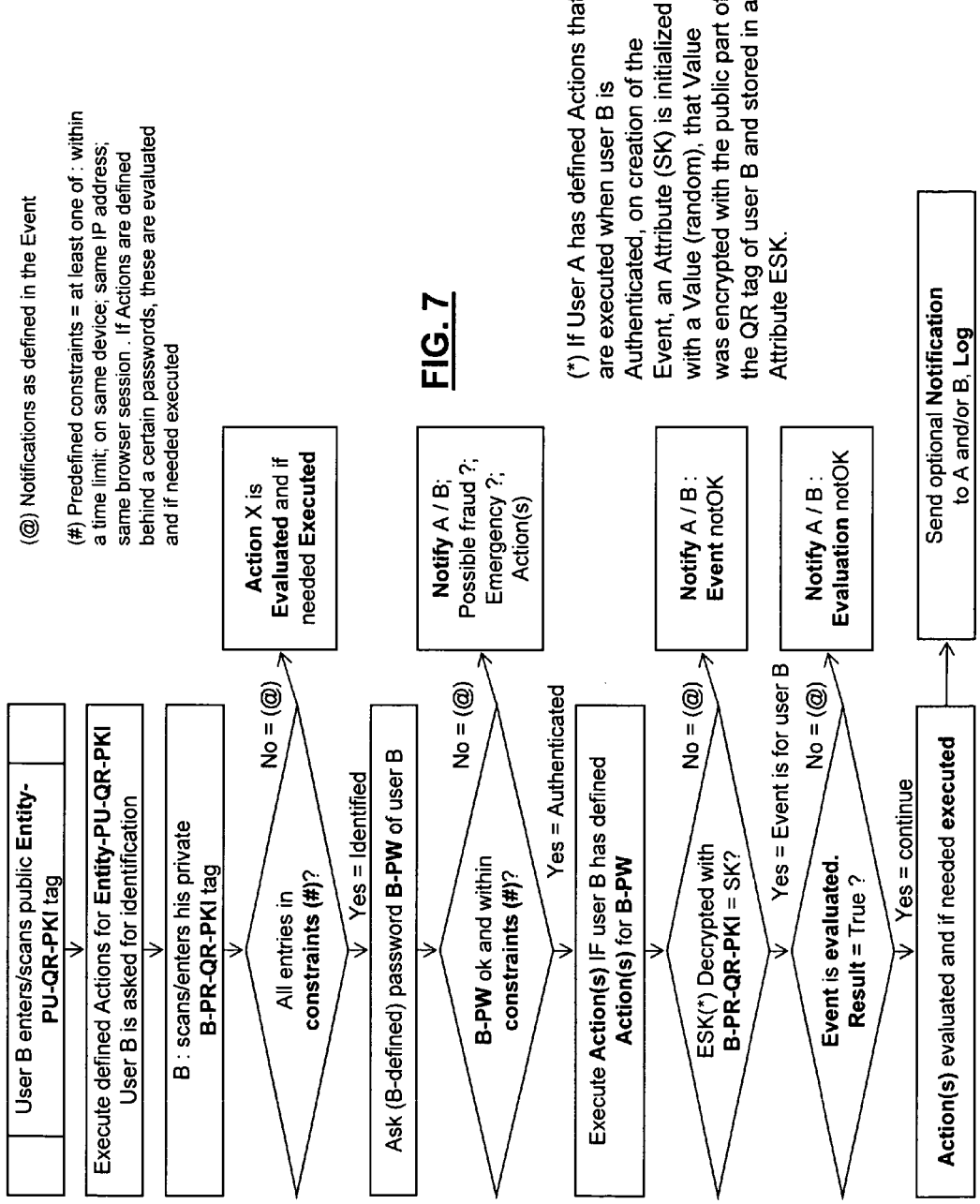
FIG. 7 shows an example of a procedure according to the invention of authentication of a second user upon scanning a public key QR-code.

A person who for example has/owns an Entity (object) to tag, creates/receives a QR-PKI-key-pair and password for that Entity (see FIG. 5), registers the QR-PKI-key-pair and password for that Entity and attaches the public QR-PKI key of the pair to that Entity. A second person can then take an action on the Entity by reading (scanning) the public QR-PKI key (see FIG. 7), possibly authenticating himself with the private part of his own QR-PKI-key-pair and password. Optionally other persons can also join in; they all have their own QR-PKI-key-pairs and passwords.

The PKI keys are combined with a service-URL to form strings of characters which are translated into QR-codes. The process of converting PKI-keys to QR-PKI-keys can be done at a service provider, the process can be reversed by the same service provider. More in particular, the QR-PKI-key can comprise a Service-URL (e.g. http://qr-pki.com or https://qr-pki.com, the URL of the service provider), all subsequent information separated with a delimiter like "/", an identifier, one or more PKI-Keys or temporary keys, and additional info such as parameters.

Figure 2:
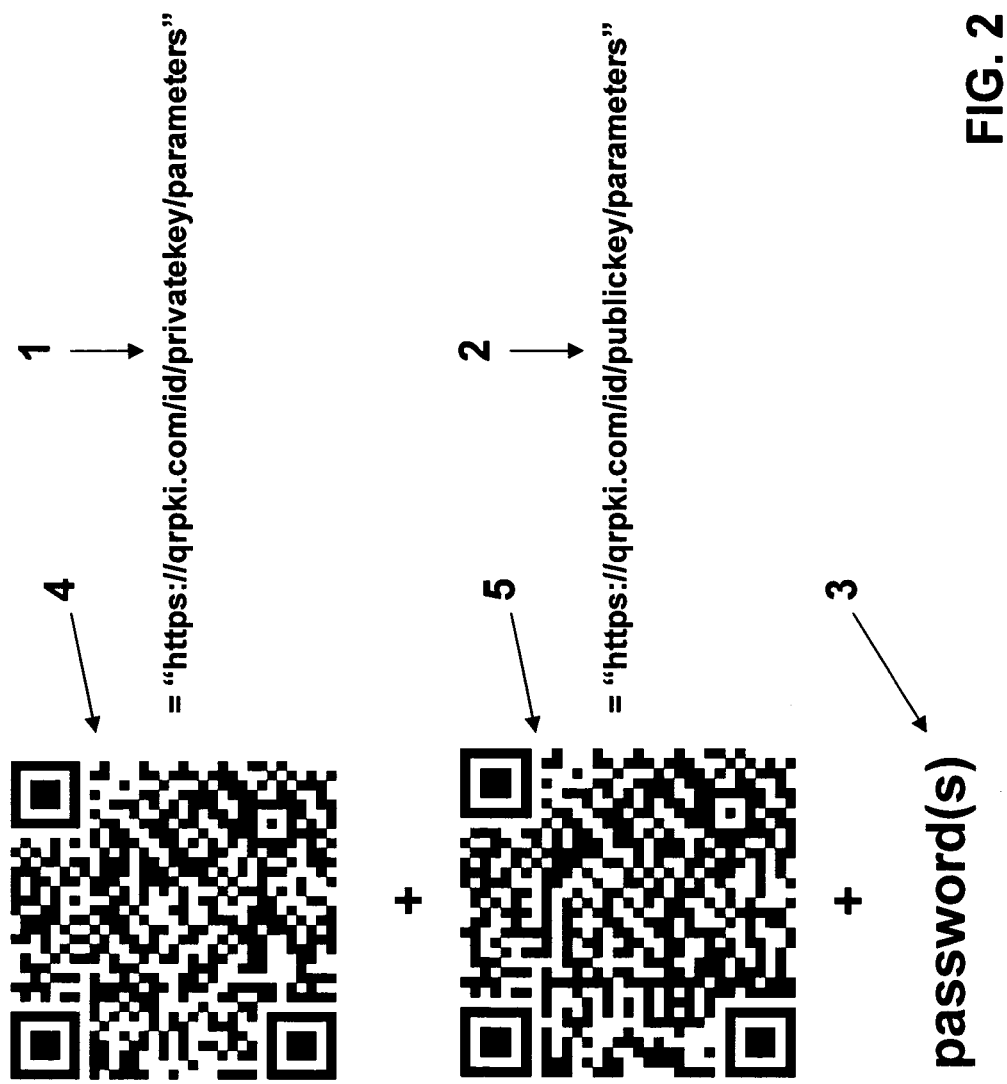
FIG. 2 represents a preferred embodiment of a set of authentication codes according to the invention.

The combination of a private key QR-code, a matching public key QR-code and one or more passwords is herein called a set of authentication codes. FIG. 2 shows a preferred embodiment of such a set of authentication codes. The set comprises at least one password 3, a private key QR-code 4 (herein also called "private QR-PKI key") and a matching public key QR-code 5 (herein also called "public QR-PKI key"). The private key QR-code 4 is a QR-code generated from a first string 1 comprising the domain name of the QR-PKI authentication server 10, an identifier for efficiency purposes, a PKI private key and possibly some parameters. The public key QR-code 5 is a QR-code generated from a second string 2 comprising the same domain name of the QR-PKI authentication server 10, an identifier for efficiency purposes, the matching PKI public key and possibly some parameters.

The QR-PKI service can be used as some examples that follow to define actions, using a common smart phone:

1) Scan a private QR-PKI key as first scan and enter the password=settings up definitions on an entity Change/Add password(s)

Change/Add attribute(s) which can be given a value

Request new sets of PKI-QR-tags to stick on entities (object, documents, containers, . . . ) Entities are then owned by the first user.

Figure 6:
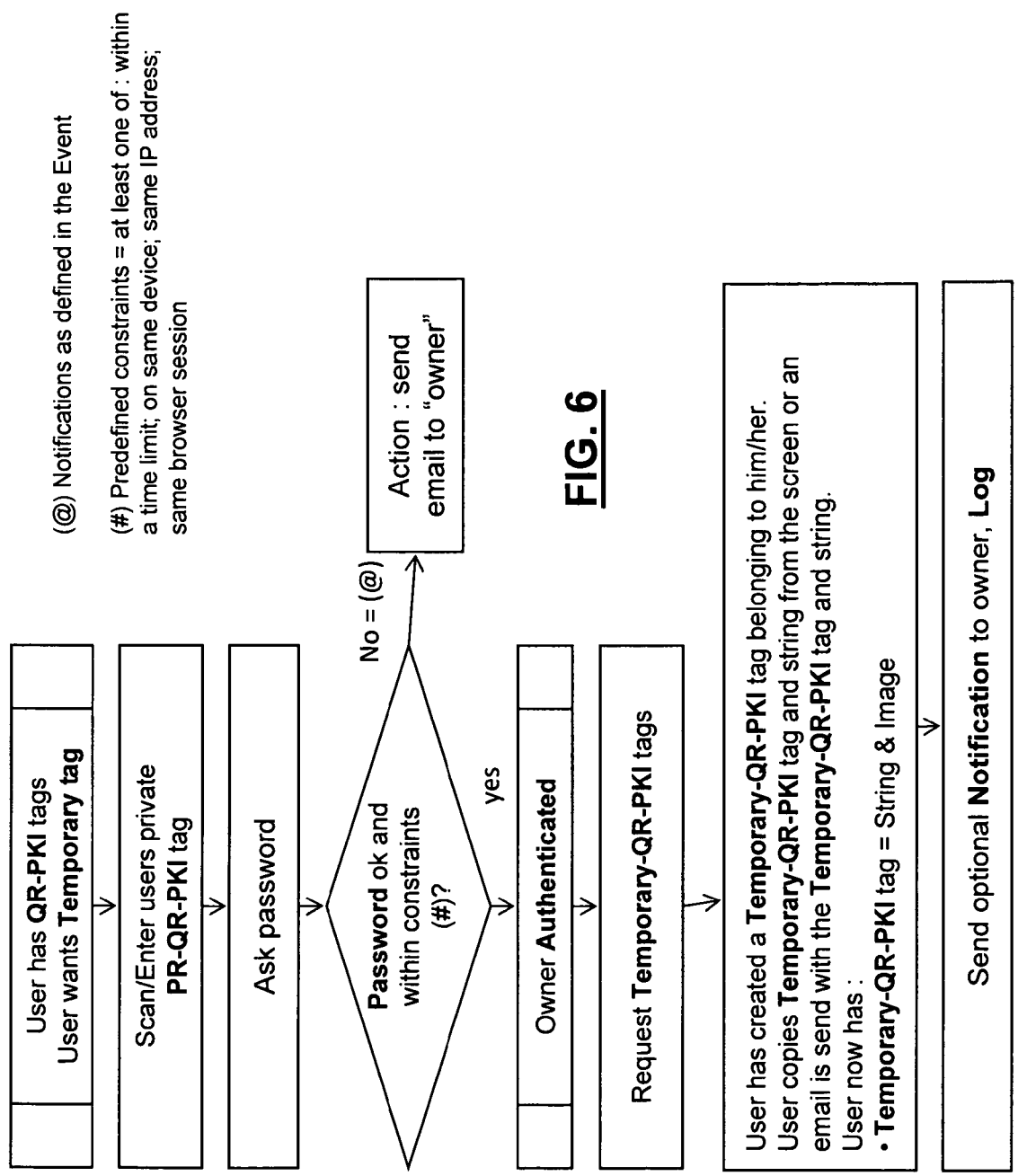
FIG. 6 shows an example of a procedure according to the invention of creating/assigning a temporary QR-code to a user.

Request temporary PKI-QR-tag (FIG. 6)

Subsequent scan a public QR-PKI key of another entity and link this with the current entity Depending on the service: add money to your account Encrypt/decrypt something Change ownership

. . .

2) Scan a public (or temporary) QR-PKI key as first scan=ask certification, retrieve info, . . . :

A public key scan is to inquire about an entity, . . . or to act upon an event defined by the owner of the corresponding private QR-PKI key (first person)

When a temporary PKI-QR key is scanned for the first time, it is activated

A subsequent scan of the (in the event defined corresponding) private QR-PKI-key to identify that you are the second person qualified to handle or see the information Subsequent enter the QR-PKI-PWord to certify that the second person is who he claims to be.

Encrypt/decrypt/verify/authenticate something

. . .

For security reasons, it can be imposed that subsequent scans or entering passwords should be done within: 1) a time frame of e.g. 60 seconds, 2) be executed with the same communication device and 3) that the user should not change networks or restart his communication device between subsequent readings.

Figure 8:
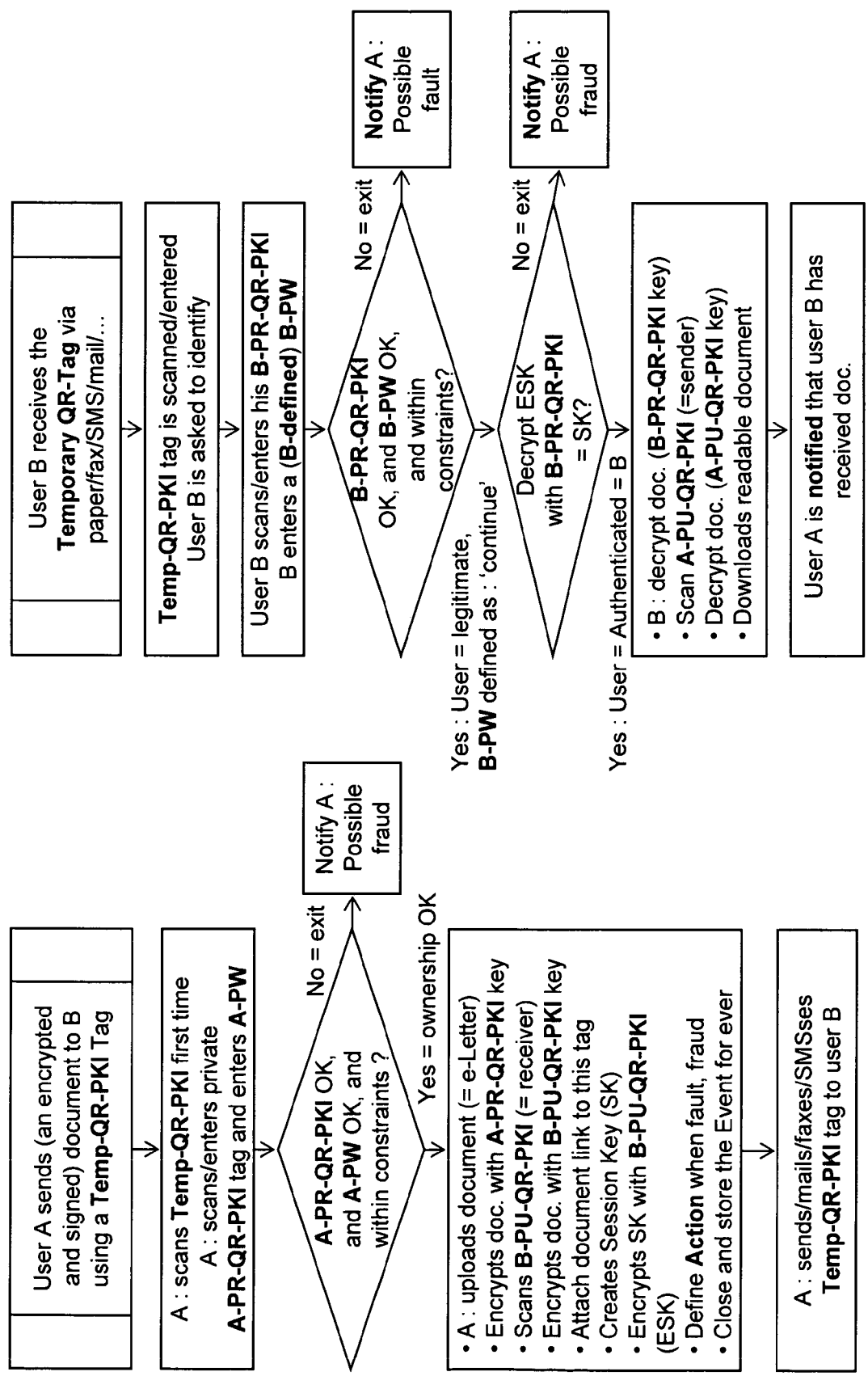
FIG. 8 shows an example of a procedure in which a first user sends an encrypted and signed document to a second user, both users being authenticated according to the invention.

A first possible application which makes use of the authentication system described above is sending of an encrypted e-Letter, which will be described with reference to FIG. 8. The following steps occur:

Setup

A wants to send an e-Letter to receiver B

Figure 3:
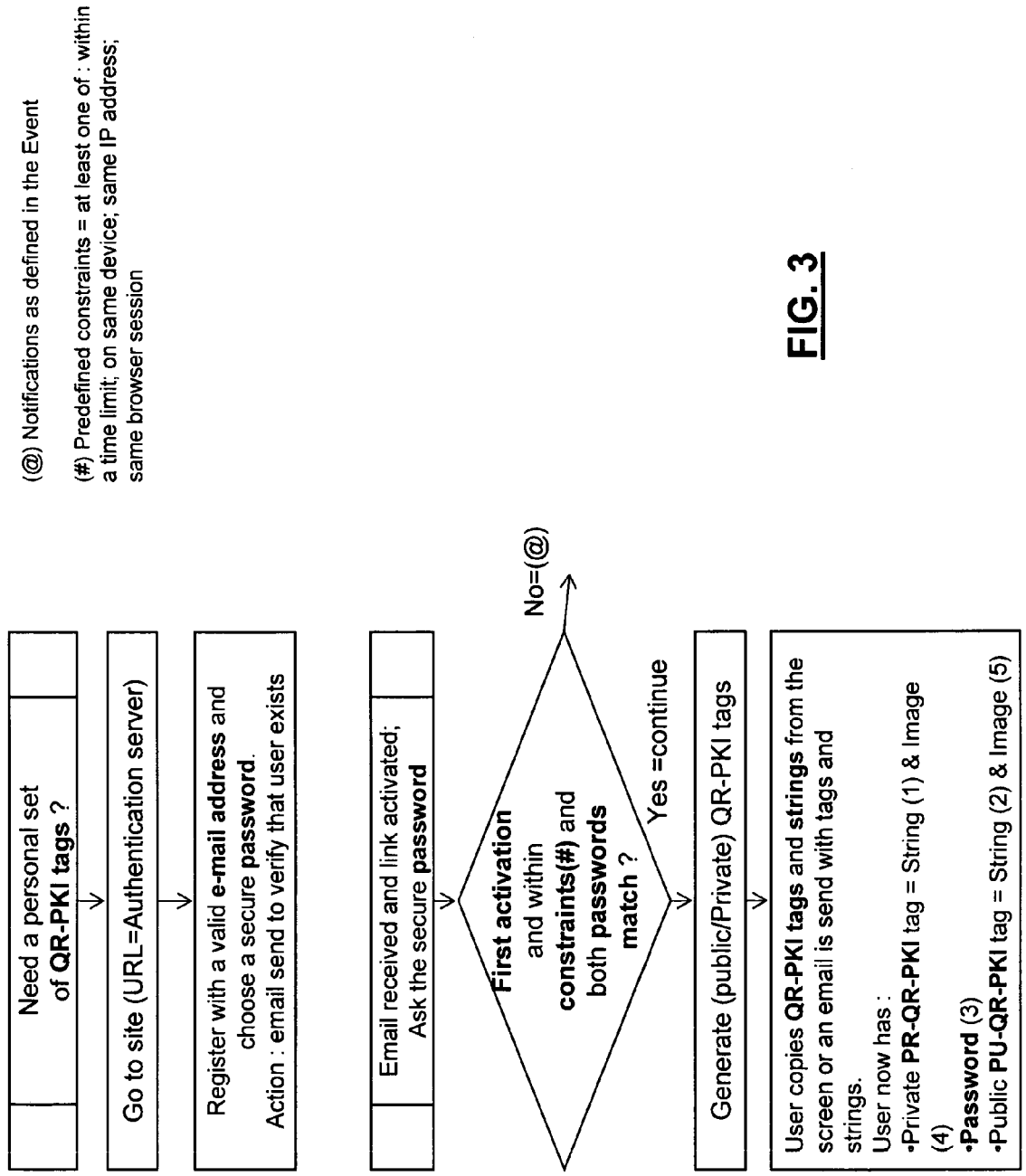
FIG. 3 represents an example of a procedure according to the invention for creating the first authentication codes for a user.

A and B have QR-PKI-tag-sets via a QR-PKI service (see FIG. 3)

A has a private A-PR-QR-PKI and public A-PU-QR-PKI

B has a private B-PR-QR-PKI and public B-PU-QR-PKI

A has a QR-Temp as a QR-tag/URL (see FIG. 6)

Define

A scans/enters QR-Temp first time to activate

A scans private A-PR-QR-PKI, enters A-Password (A=Authentic)

A uploads e-Letter and connects it to QR-Temp

A encrypts e-Letter with A-PR-QR-PKI

A scans the public B-PU-QR-PKI of receiver B

A encrypts e-Letter again with B-PU-QR-PKI

A closes the QR-Temp event

A sends QR-Temp to B (mail, post, SMS, . . . )

Execute

B receives QR-Temp from A (mail, post, SMS, . . . )

B scans/enters QR-Temp (=link to e-Letter)

B scans private B-PR-QR-PKI, enters B-Password (B=Authentic)

B decrypts e-Letter with B-PR-QR-PKI (e-Letter was for B only)

B scans the public A-PU-QR-PKI of A (A=sender)

B decrypts e-Letter with A-PU-QR-PKI (A=only possible sender)

B retrieves (the location of) the readable e-Letter

B can read the e-Letter and is sure that it came from A

Notification

A is informed that B has received e-Letter

A is sure that only B can read the e-Letter

While this seems complex at first sight, both persons have in fact only to scan three QR-PKI keys and enter a password to send and receive the encrypted and signed electronic-Letter. In the end, to a high degree of certainty, B knows that the e-Letter can only have been sent by A and A knows that only B can read the e-Letter. If the signing and encrypting is not necessary, the number of scans for the sending party can be reduced to two and reduced to one scan by the receiving party.

The invention will be further clarified by means of the following exemplary cases. The use of the invention is not limited to those cases, they just serve as examples of how to use the invention. By mixing certain method steps from one case with steps from another case, new cases can be created, all within the scope of the invention. In the various examples QR-codes are used as containers. However, as already mentioned above, QR-codes constitute just one possible implementation. Also RFID tags containing keys can be applied, as well as near-field communication (NFC) tags etc. . . . . . The Trusted Third Party (TTP) in the examples below constitutes all services needed to make up the system according to the invention.

Case 1 (See FIG. 9(a-c))

In this case remote access is granted to a facility. The visitor is uniquely defined, the window in time and date of possible access. The owner is notified when the visitor is entering and optionally leaving the facility.

SETUP: A facility owner (Own) wants to grant remote access to a visitor (Vi) at facility (Fac) within a certain time window, using a process according to the invention via a Trusted Third Party (TTP).

DEFINE PERSONS "OWN" AND "VI": Both Own and Vi are accessing the website of UP (e.g. https://qr-pki.com) and both registering themselves, creating a set of QR-PKI tags (a private QR-PKI-tag and a public QR-PKI-tag) and associated passwords (keys and QRtags can be copy/pasted from the browser or sent via e-mail). Depending on the TTP, at least the e-mail address has to be defined and checked (by e-mail confirmation), more information can be entered by means of attributes being defined and values entered (e.g. extra passwords, extra e-mail addresses).

Person Own now has a private QRtag "Own-PR-QR-PKI", a public QRtag "Own-PU-QR-PKI" and a secret master password "Own-PW". Both QRtags are represented by an image (which can be read by said communication devices) and by an alphanumerical string (which can be sent electronically).

Person Vi now has a private QRtag "Vi-PR-QR-PKI", a public QRtag "Vi-PU-QR-PKI" and a secret master password "Vi-PW". Both QRtags are represented by an image (which can be read by said communication devices) and by an alphanumerical string (which can be sent electronically).

Person Own requests a new QRtag for the facility "Fac". Person Own logs in at the TTP using his Own-PR-QR-PKI and certifying with his Own-PW. Own requests a new QRtag for an object, thus creating a private QRtag "Fac-PR-QR-PKI", a public QRtag "Fac-PU-QR-PKI" and a secret master password "Fac-PW". Both QRtags are represented by an image (which can be read by said communication devices) and by an alphanumerical string (which can be sent electronically). The TTP has now registered that Own owns an entity Fac.

REQUEST access: if person Own wants to grant access to person Vi or Vi asks permission to enter facility Fac, Own retrieves the public QRtag of person Vi (Vi-PU-QR-PKI). If appropriate, time, date, duration of access can be negotiated and agreed upon.

DEFINE the event: access to the facility Fac by Vi. Own scans or sends the Fac-PR-QR-PKI of the facility to the TTP, identifying Own as owner. To prove this, Own is requested to enter the Fac-PW. Own can now define parameters, attributes, variables and set certain values (e.g. the code for the door at facility to open it, the time zones between which access is possible, the way to notify the owner on access, the way to notify the visitor on access). To identify the Vi, the QRtag Vi-PU-QR-PKI is sent or scanned. All consecutive scans, entries should be performed within a defined time frame and from the same said communication device. From all information, the event is created in the database and a random session key (SK) is generated and stored. That secret key is then encrypted by the Vi-PU-QR-PKI and stored (ESK). Depending on the functionality, that encrypted secret key ESK, is encrypted again by the key Fac-PR-QR-PKI and stored (CESK). The Own now places the Fac-PU-QR-PKI at the door of the facility. Depending on the functionality, that Fac-PU-QR-PKI can be fixed (e.g. printed on paper), or can be displayed on a screen on request of the visitor (when the doorbell is activated). In the latter case, the Fac-PU-QR-PKI can be extended with extra info (D) (e.g. a string with reference to the date and time, a secret). That extra info D can change at any moment, this prevents that the Fac-PU-QR-PKI is copied and scanned not at the entrance of the facility. The Fac owner can activate a "timed code function"—a service from the TTP—which sends regularly extended forms of the Fac-PU-QR-PKI, that is a QRtag with the service URL of the TTP, the public key and the extra parameter D containing which is related to a date and time of its creation.

EXECUTE the event, i.e. grant or deny access to facility. For the ease of use, mobile communication devices are being used. Vi is approaching the facility and scans the Fac-PU-QR-PKI (or extended Fac-PU-QR-PKI with the secret D included) at the entrance of the facility. When within the defined time zones, Vi is requested to read the Vi-PR-QR-PKI and enters the password Vi-PW, all within the defined time frame and on the same mobile device to be valid. If the entered password matches the Vi-PR-QR-PKI, the defined event is executed. If the extra info D is present in the scanned Fac-PU-QR-PKI, it is checked against the data stored. When both match, the content of CESK is decrypted with Fac-PU-QR-PKI and then decrypted again with Vi-PR-QR-PKI, as an alternative the content of ESK can be decrypted with Vi-PR-QR-PKI. If the results matches the secret key SK, the event is positive, the defined action(s) is/are executed (e.g. send the code to open the door). Optionally, the Vi scan repeats a similar procedure to exit. When Vi is trying the same procedure outside the defined times zones, the result will be negative, in this case the door will not open. If needed, a similar procedure can be setup when visitor leaves the facility.

NOTIFY: Depending on the setup, the owner, the visitor, a third party can be informed via e-mail, SMS (depending on what is defined in the Setup) stating the access or the denial of the access to the facility, including information on the visitor. All reasons for not terminating an event can be notified depending on the setup of the event.

USAGE: This typical setup of the QR-PKI system and method assures that—by using easy-to-produce QRtag—a great flexibility and security is obtained, the reading equipment being a said communication device or normal smart phone. This example can be extended not only to open doors, but to switch on or off anything that can be remotely controlled by commands sent via a computer. It can be used to monitor the inspection rounds of security agents and automatically report back every QRtag scan to the agency. Meanwhile the system creates a log of inspection points thus assuring that the agent is really on the spot. Those logs can be read by an expert system and used to alert when irregularities occur. The building owner whose building is being inspected can have logs of those inspection rounds e.g. for billing purposes. To make sure that "smart" agents don't just photograph the QRtag and use it the day after, the building owner can—at any moment—add extra info/parameters to the QRtag, info that is sent to the building owner to verify that inspection rounds really took place on the spot. Since a bidirectional communication is setup between the visitor/agent scanning the QRtag at certain points, it is simple to send that person an instruction video/audio fragment. Since the visitor/agent is known, the place, date and time of day in know, the information sent can be adapted to the specific needs (e.g. correct language, video/info with up to instructions, . . . ) without the need of notifying or instructing the visitor/agent in advance.
Case 2 (See FIG. 10(a-d))

Trusted agents to residential facilities are identified. The agent is uniquely defined, as well as the window in time and date of possible access, the nature of the visit. The agency is notified when the agent is entering and optionally leaving the facility.

SETUP: The owner (Own) of a facility or a residential (Lo=Location Owner) wants to identify the authenticity of the visiting agent (Va) before opening the door for the visiting agent, using a process according to the invention via a Trusted Third Party (TTP). The agent (Va) is sent by an agency or an Access Requesting Company (ARQ) that uses a process according to the invention to certify that the Va is indeed permitted to ask access on behalf of the ARQ. The agent Va has to start his day by authenticating to personnel of the ARQ (Aacp).

DEFINE PERSONS AND OBJECTS: All involved persons have accessed the website of TTP (e.g. https://qr-pki.com) and have registered themselves, creating a set of QR-PKI tags (a private QR-PKI-tag and a public QR-PKI-tag) and associated passwords (keys and QRtags can be copy/pasted from the browser or sent via e-mail). Depending on the TTP, at least the e-mail address has to be defined and checked (by e-mail confirmation), more information can be entered by means of attributes being defined and values entered (e.g. extra passwords, extra e-mail addresses).

Persons Own now has a private QRtag "Own-PR-QR-PKI", a public QRtag "Own-PU-QR-PKI" and a secret master password "Own-PW". Both QRtags are represented by an image (which can be read by said communication devices) and by an alphanumerical string (which can be sent electronically).

Persons Va now has a private QRtag "Va-PR-QR-PKI", a public QRtag "Va-PU-QR-PKI" and a secret master password "Va-PW". Both QRtags are represented by an image (which can be read by said communication devices) and by an alphanumerical string (which can be sent electronically).

Personnel of the ARQ now has a private QRtag "ARQ-PR-QR-PKI", a public QRtag "ARQ-PU-QR-PKI" and a secret master password "ARQ-PW". Both QRtags are represented by an image (which can be read by said communication devices) and by an alphanumerical string (which can be sent electronically).

Person Own requests a new QRtag for his residential, facility as location owner "Lo". Person Own logs in at the TTP using his Own-PR-QR-PKI and certifying with his Own-PW. Own requests a new QRtag for an object, thus creating a private QRtag "Lo-PR-QR-PKI", a public QRtag "Lo-PU-QR-PKI" and a secret master password "Lo-PW". Both QRtags are represented by an image (which can be read by said communication devices) and by an alphanumerical string (which can be sent electronically). The TTP has now registered that Own owns an object Lo. Own puts the tag visible from the outside (e.g. behind the window). For the ease of use, mobile communication devices are being used.

On request, the TTP can issue temporary single and unique keys in form of a QRtag (e.g. "ARQ-QR-Temp").

IDENTIFY: the agent has to start his duty by registering as being a valid visiting agent (Va). He scans the ARQ-PU-QR-PKI at the reception desk of the agency he works for. For added security, that ARQ-PU-QR-PKI can be extended with daily changing, not publicly known info. The Va is presented with a welcome screen on his mobile device and requested to identify. Next the agent scans his personal Va-PR-QR-PKI, he is then requested to enter duty details and the password (Va-PW). When the password matches the Va-PR-QR-PKI and everything is done on the same mobile device and within the define time frame, the event is executed further and creates a session key (SK) and an ARQ-PU-QR-PKI encrypted version of SK (=ESK). The TTP sends a temporary event tag in the form of ARQ-QR-Temp1 to the display of the mobile device of the agent Va. The Aacp scans the ARQ-QR-Temp1 tag from the agents display. The Aacp is shown details of Va's duties and is asked to grant or revoke the request. Next the Aacp scans the ARQ-PR-QR-PKI tag and enters the password ARQ-PW. If the password matches, the ESK is decrypted with ARQ-PR-QR-PKI and should match SK to be valid. Upon acknowledgement, the agent now becomes a verified visiting agent (Va) from the agency ARQ for the next x hours. A temporary tag in the form of ARQ-QR-Lic is created and sent to both Aacp and Va. When the duty of the Va is over, the procedure can be repeated stating that fact and revoking ARQ-AR-Lic. When needed during duty hours (e.g. Va becomes rogue), Aacp can revoke the validity of the ARQ-QR-Lic.

AUTHENTICATE: when the Va approaches the Lo property, he scans ARQ-QR-Lic (=check validity of duty), he is asked to scan Lo-PU-QR-PKI at the facility entry. All scans or entries should be executed on the same mobile device and within the define time frame Va scans his VA-PR-QR-PKI enters the VA-PW with duty details, purpose of visit . . . . If the password matches, a session key (SK) and a Lo-PU-QR-PKI encrypted version of SK (=ESK) are created. Next TTP sends a temporary event tag in the form of ARQ-QR-Temp3 to the display of the mobile device of the agent Va (=a link to the duty and validity of the agent). That tag is valid for the next y minutes. Next Lo is asked to scan ARQ-QR-Temp3 from the agent's mobile device (that can be done even through a closed window). Lo is scanning this with his own mobile device and then scans his Lo-PR-QR-PKI tag, Lo is asked to accept or decline the job and enter the Lo-PW. When within y minutes the ESK is decrypted with Lo-PR-QR-PKI and if the result matches SK, the information concerning the identity of the Va, the purpose of the visit . . . , are authentic and sent to the mobile device of the Lo. Lo now can verify that the Va agent is legitimate and grant access to the facility. ARQ is sent a message that Va has entered. Both parties can optionally be given instructions. The same procedure can be followed when the Va has finished his visit and is outside the facility. That way Lo is safely inside and the ARQ is notified that the visit is over, making it possible to already handover information gathered from that visit.

NOTIFY: Depending on the setup of the event, ARQ, Aacp, Va, Lo, can be notified stating the different stadia of the event. All reasons for not terminating the event can be notified also, depending on the setup of the event.

IDENTITY THEFT: Assume the VA-PR-QR-PKI tag is stolen or assume the VA-PW is retrieved with threat. If the Va was able to give a defined 'VA-PW under threat', the ARQ will be notified of that event. At that moment Lo is advised not to open for the (fake) Va. At any moment the Aacp can revoke the validity of the ARQ-QR-Lic records.

USAGE: This typical example demonstrates the full potential of the system and method. A chain of events can be concatenated to create complex events based on the same principle. Two parties build up a trusted relation by exchanging (secret) information that can only be verified by the party the information is meant for. In the case above, the agency can be for example the electricity company, water company in need to verify the metering. That company sends out agents to verify the meter on the location. But for the residential, it is not always clear if that person is actually a police officer or the meter guy he pretends to be. By using a process according to the invention no one can just dress up like an agent and talk his way into the building.

Case 3 (See FIG. 11(a-b))

This case is concerned with locating and identifying (lost) objects and persons, or with having to send crucial information to such persons. Every object tagged with QR-PKI tags can be retrieved by an innocent bystander who happens to find the object or comes across a(n elderly) person having lost his way, or arriving at an accident location trying to identify or retrieve (emergency medical) information about that person.

SETUP: The owner (Own) of an object (or person responsible for another person) wants to locate the lost object or person, using a process according to the invention via a Trusted Third Party (TTP).

DEFINE THE OWNER: The owner has accessed the website of TTP (e.g. https://qr-pki.com) and has registered, creating a set of QR-PKI tags (a private QR-PKI-tag and a public QR-PKI-tag) and associated passwords (keys and QRtags can be copy/pasted from the browser or sent via e-mail). Depending on the TTP, at least the e-mail address has to be defined and checked (by e-mail confirmation), more information can be entered by means of attributes being defined and values entered (e.g. extra passwords, extra e-mail addresses).

Person Own now has a private QRtag "Own-PR-QR-PKI", a public QRtag "Own-PU-QR-PKI" and a secret master password "Own-PW". Both QRtags are represented by an image (which can be read by said communication devices) and by an alphanumerical string (which can be sent electronically).

DEFINE THE OBJECT: Person Own requests a new QRtag for objects or persons to be marked. Person Own logs in at the TTP using his Own-PR-QR-PKI and certifying with his Own-PW. Own requests a new QRtag for an object, thus creating a private QRtag "Obj-PR-QR-PKI", a public "QRtag Obj-PU-QR-PKI" and a secret master password "Obj-PW". To prove authenticity, the owner enters an alphanumerical value A in the field "Authenticate string" for that object (e.g. WD6G 3US9 Q90D HT8X). Both QRtags are represented by an image (which can be read by said communication devices) and by an alphanumerical string (which can be sent electronically). The alphanumerical value A is printed in clear text under the QRtag image of the public QRtag Obj-PU-QR-PKI. When the Own scans the Obj-PR-QR-PKI and enters the Obj-PW, he defines what information is returned when the Obj-PU-QR-PKI is scanned under normal conditions (e.g. the value A, a general information video on the object, general information on what to do) and if he wants to be notified of every scan made. The TTP has now registered that Own owns an object Obj. Own puts the tag visible on the object or puts in on the clothing of the person, visible to others.

RETRIEVE: When the owner finds out the Obj is lost, he changes the parameters of the Obj by scanning the Obj-PR-QR-PKI key of the object and entering the correct password Obj-PW. Any innocent bystander (IB) scanning the Obj-PU-QR-PKI tag now, will see information on how to return the object to the Own or is asked to enter details of its location. Even an SMS can be sent to the Own if that is defined in the actions to be taking on scanning Obj-PU-QR-PKI from now on. IB can see that the tag is genuine because he is returned the alphanumerical value A printed under the QRtag. In this case, the IB does not need to have an account with the TTP.

USAGE: in this case, the QRtag is just used to activate an event created in the system, it does not use the method of 2 consecutive QRtag scanned within a limited time window. But the schema can be extended at any moment, making it mandatory to read a second—personal private QRtag—in order to activate the event. In this case, however, it might not be the desired effect, since, when an object is lost, it doesn't matter if the finder has a valid private QRtag or not and any said communication device should work.

Case 4 (See FIG. 12(a-b))

Secure e-Wallet Payment Activation is now described. Micropayments are getting more and more popular nowadays. This case demonstrates the execution of such a payment while mobile with a minimum of handling and maximal security level. This avoids the hassle of having different payment schemes with different e-wallet services and different authentication methods.

SETUP: An e-Wallet user (eWu) has a normal e-Wallet service provider contract in place. The eWu wants to make payments possible (while mobile) using an easy process according to the invention via a Trusted Third Party (TTP).

DEFINE THE E-WALLET USER: The eWu has accessed the website of TTP (e.g. https://qr-pki.com) and has registered, creating a set of QR-PKI tags (a private QR-PKI-tag and a public QR-PKI-tag) and associated passwords (keys and QRtags can be copy/pasted from the browser or sent via e-mail). Depending on the TTP, at least the e-mail address has to be defined and checked (by e-mail confirmation), more information can be entered by means of attributes being defined and values entered (e.g. extra passwords, extra e-mail addresses).

Person eWu now has a private QRtag "eWu-PR-QR-PKI", a public QRtag "eWu-PU-QR-PKI" and a secret master password "eWu-PW". This is the only password that can change or add properties or attributes to the eWu-QRtag records. Both QRtags are represented by an image (which can be read by said communication devices) and by an alphanumerical string (which can be sent electronically). eWu can define additional passwords for his eWu-QRtag e.g. a password that will certify that he is actually eWu, but that he will be using under threat. Entering that password will not only execute the requested event, but additionally send a message e.g. to emergency services. eWu can also add passwords that will NOT execute the event, but only send a message to e.g. an emergency service. More passwords can be created, "positive" password to execute the event that is being executed normally, but with additional notifications, or "negative" passwords that will NOT further execute the event being executed, but notify a predefined instance e.g. via SMS, e-mail.

DEFINE THE ACCOUNT TO PAY: Person eWu requests a new QRtag for each account to be paid via the e-Wallet service provider. Person eWu logs in at the TTP using his eWu-PR-QR-PKI and certifying with his eWu-PW. eWu requests a new QRtag for each account (Acc), thus creating a private QRtag "Acc-PR-QR-PKI", a public QRtag "Acc-PU-QR-PKI" and a secret master password "Acc-PW". Both QRtags are represented by an image (which can be read by said communication devices) and by an alphanumerical string (which can be sent electronically). The eWu defines the information needed for an electronic transfer, e.g. his account number, username and password to transfer the actual money via the e-Wallet service provider, the account number to transfer the money too and the amount to transfer. All information that is not provided for, can be asked for when the transfer needs to take place. The event also states the API or URL call that needs to be executed when the transfer should take place and the protocol or parameter list of such a call.

When the event is defined, a session key (SK) is generated and stored. That SK is encrypted with eWu-PU-QR-PKI and stored (ESK). The eWu takes with him every Acc-PU-QR-PKI and his eWu-PR-QR-PKI. The eWu will remember his eWu-PW and his own created secondary passwords (e.g. the one under threat, the negative one with only notifications).

TRANSFER: when the eWu wants to pay for a service, he pulls out the correct Acc-PU-QR-PKI and scans this QRtag. Next he is asked to present his eWu-PR-QR-PKI and provide his eWu-PW to certify that the person is actually eWu, all within the defined time frame and on the same mobile device. The stored ESK be decrypted with eWu-PR-QR-PKI and compared to the stored SK. If both match the execution continues, the Acc is authentic. Depending on the entered password, the event is executed normally (the correct eWu-PW is provided) or will execute according to the definitions in the event on submitting a secondary password. When the transfer should take place (a positive eWu-PW is entered), then the information not provided in the Acc is asked for (e.g. amount). When the information is complete, the TTP will execute an API providing all the needed steps to actually execute the payment.

NOTIFICATION: the eWu is notified on the positive or negative outcome of the API doing the actual transfer. An e-mail is sent to the eWu for later reference, optionally (when defined) the beneficiary of the transfer is sent a message stating the transfer result.

USAGE: By using a system and method of the invention, a payment can be securely done, with a high level of security and with the aid of normal smart phones on which no secret is stored. By using secondary passwords, even under threat the person can notify predefined instances without the aggressor knowing it since the transaction can take place. When Acc-PU-QR-PKI tags are stolen or copied, the owner (which has the Acc-PR-QR-PKI and Acc-PW) can modify the event to do completely something else, e.g. ask identification to the one scanning the Acc-PU-QR-PKI, or send his IP-address, mobile device details to authorities for later reference or evidence.

Case 5 (See FIG. 13(a-b))

Authenticity is certified. Nowadays, many goods and objects are made in countries which do not make genuine products but counterfeits of existing products. This case demonstrates the use of QR-tags in the fight against counterfeit and to turn every citizen in a possible "snitch" for counterfeit products. As a side product, the original equipment manufacturer can set up "a relation" with anyone along the way between manufacturer and end-user of the product.

SETUP: A manufacturer wants to authenticate and trace its product, goods and packages using a process according to the invention via a Trusted Third Party (TTP). The authentication can be done in a quick way (one scan, create a trace, find duplicates) or in a complete way (double scan, to certify that the product is genuine).

DEFINE THE MANUFACTURER/PRODUCER: The manufacturer, producer (Prod) has accessed the website of TTP (e.g. https://qr-pki.com) and has registered, creating a set of QR-PKI tags (a private QR-PKI-tag and a public QR-PKI-tag) and associated passwords (keys and QRtags can be copy/pasted from the browser or sent via e-mail). Depending on the TTP, at least the e-mail address has to be defined and checked (by e-mail confirmation), more information can be entered by means of attributes being defined and values entered (e.g. special timed codes and the interval at which to send that information to Prod, additional information).

Producer now has a private QRtag "Prod-PR-QR-PKI", a public QRtag "Prod-PU-QR-PKI" and a secret master password "Prod-PW". Both QRtags are represented by an image (which can be read by said communication devices) and by an alphanumerical string (which can be sent electronically). Producer can publish the Prod-PU-QR-PKI, added with an extra periodically changing information only Producer knows and can therefore know when (a copy of) Prod-PU-QR-PKI is scanned and check against own notifications that are sent according to setup in the event when Prod-PU-QR-PKI is scanned.

DEFINE THE GOODS, PACKAGES: Producer Prod requests new sets of QR-PKI-tags for each good (Good) and for each package (Pack) to be marked, traced or proven its authenticity. Producer Prod logs in at the TTP using his Prod-PR-QR-PKI and certifying with his Prod-PW. Prod requests new sets of QR-PKI-tags for each Good and for each container of goods called Pack (e.g. by submitting a spreadsheet containing the details for the QR-PKI-tags to be created). Each QR-PKI-tag record has at least following Attributes created: 1) the public part of the QR-PKI-tag for each Good or Pack, (further called A), which is a reference to the product defined. 2) A random alphanumerical code string (further called B) in an easy readable form (e.g. "WD6G 3US9 Q90D HT8X"), which will be printed in clear text underneath the QR-Tag image. 3) A random, unique, secret code, including a reference to the date and time (further called T), 4) the private part of the QR-PKI-tag and 5) additional information like serial number, model, make, . . . . Thus one creates QR-PKI-tags called Good-PR-QR-PKI and Good-PU-QR-PKI with no password for goods, Pack-PR-QR-PKI and Pack-PU-QR-PKI with no password for packages. The fact that no password is provided, means that the information is not changeable once the events records are created. For both types of QR-PKI-tags, the private part is not represented by an image, but only as an alphanumerical string as it will not be available for scanning. For both types of QR-PKI-tags, the public part is represented by an image (which can be read by said communication devices) and by an alphanumerical string, both containing the service URL, an identifier (further called i), the value A (=public key of the QR-PKI-tag), an encrypted version of T (T encrypted with Prod-PR-QR-PKI next encrypted with A, further called U) (e.g. qrpki.com/i/A/U). The alphanumerical value B is printed in clear text under the QR-PKI-tags. Depending on the configuration, other information can be printed in clear text as well (e.g. serial number). The Prod attaches these Good-PU-QR-PKI and Pack-PU-QR-PKI to the correct goods and packages. The Prod defines on creation of the QR-PKI-tags what information is returned when a Good-PU-QR-PKI or Pack-PU-QR-PKI is scanned (e.g. information, the string B, a handling video, . . . ).

AUTHENTICATE/TRACE: when Good-PU-QR-PKI or Pack-PU-QR-PKI QRtags are scanned, the events are logged for later reference or data mining by Prod. As date, time and whereabouts (IP-address) are logged, Prod has an overview of where which products or goods are. On each scan of Good-PU-QR-PKI or Pack-PU-QR-PKI, A in the QR-PKI-tag is used to look up the record and the random code string B is returned to the mobile device of the person scanning the QR-PKI-tag. This is a first check to visually control if the product/good is possibly authentic. If the returned string B matches the printed string under the QR-PKI-tag, there is a good chance the product/good is authentic, possibly the scanned QR-PKI-tag is authentic, but still it can be an exact copy of an existing QR-PKI-tag, or clever people may have created an own "look-alike" tag with another service provider to cheat the user when returning the correct printed B value. If the same Good-PU-QR-PKI or Pack-PU-QR-PKI QRtags keeps popping up at different times and different locations (derived from the IP-address), then a counterfeit organization may have been duplicating that products and also the (same) QRtag. This is a first—one way—easy manner to start authenticating and tracking. This will not stop counterfeit companies from producing exact copies, but if several copied QRtags appear, it is clear that counterfeit is a fact and authorities can be sent to look for these product, starting from the first scan of that particular QRtag (and IP address).

For a more thorough check, the procedure above described can be extended. After scanning the Good-PU-QR-PKI or Pack-PU-QR-PKI, the person is asked to consecutively and within a defined time frame scan the published (extended) Prod-PU-QR-PKI on the corporate web site. From the (extended) Prod-PU-QR-PKI scan, the U part in the Good-PU-QR-PKI or Pack-PU-QR-PKI QRtag is decrypted with private key which can be retrieved when looking for the record which is identified in the A part of the QRtag. Next, the result is decrypted with the Prod-PU-QR-PKI key and the result is checked against T. If both match the QRtag, the product is definitely genuine and data is checked against the database of the Producer, with an up to date version when the extended version of Prod-PU-QR-PKI is used. If in the past there were no copies detected (multiple scan of the same Good-PU-QR-PKI or Pack-PU-QR-PKI QRtag), then it is reasonable to assume that no counterfeit products are equipped with Good-PU-QR-PKI or Pack-PU-QR-PKI QRtag.

USAGE: Through the whole chain of transport from factory to retail to end-user, scans can produce the trail of the products giving Producer insight in where the products are used, and if needed the Producer can interact with the persons scanning the tags or can send useful information like manuals, handling instructions or additional (brand) information. When incentives are involved to encourage end-users to scan the Good-PU-QR-PKI QRtags, that information can be used for life cycle management and even end-of-life processing and recycling. Meanwhile the Producer can track the whereabouts of its products, where possible counterfeits are and keep in touch with the end-user.

Case 6 (See FIG. 14(a-d))

This example shows how to verify (trusted) goods and objects without having to search for documents or to look for the sender or receiver (e.g. customs).

SETUP: The sender (Se) want to send a shipping container (Con) with goods to a receiver (Re). Along the way checking entities (CE) like customs want to check the content, the accompanying documents, using a process according to the invention via a Trusted Third Party (TTP).

DEFINE THE SENDER, RECEIVER AND CHECKING ENTITIES: all parties have accessed the website of TTP (e.g. https://qr-pki.com) and have registered, creating a set of QR-PKI tags (a private QR-PKI-tag and a public QR-PKI-tag) and associated passwords (keys and QRtags can be copy/pasted from the browser or sent via e-mail). Depending on the TTP, at least the e-mail address has to be defined and checked (by e-mail confirmation), more information can be entered by means of attributes being defined and values entered (e.g. extra passwords, extra e-mail addresses).

The sender Se now has a private QRtag "Se-PR-QR-PKI", a public QRtag "Se-PU-QR-PKI" and a secret master password "Se-PW". Both QRtags are represented by an image (which can be read by said communication devices) and by an alphanumerical string (which can be sent electronically).

The receiver Re now has a private QRtag "Re-PR-QR-PKI", a public QRtag "Re-PU-QR-PKI" and a secret master password "Re-PW". Both QRtags are represented by an image (which can be read by said communication devices) and by an alphanumerical string (which can be sent electronically).

The checking entity CE now has a private QRtag "CE-PR-QR-PKI", a public QRtag "CE-PU-QR-PKI" and a secret master password "CE-PW". Both QRtags are represented by an image (which can be read by said communication devices) and by an alphanumerical string (which can be sent electronically). For the purpose of this example the CE-PU-QR-PKI can be published.

DEFINE THE CONTAINER: Sender (Se) requests a new QRtag for the container he wants to send to receiver (Re). Sender logs in at the TTP using his Se-PR-QR-PKI and certifying with his Se-PW. Sender requests a new QRtag set for the container, thus creating a private QRtag Con-PR-QR-PKI, a public QRtag Con-PU-QR-PKI and a secret master password Con-PW. Both QRtags are represented by an image (which can be read by said communication devices) and by an alphanumerical string (which can be sent electronically).

By scanning the Con-PR-QR-PKI and entering the Con-PW, the sender can define what information is returned when the Con-PU-QR-PKI is scanned (e.g. the way to handle the container, information about its content) and if he wants to be notified of every scan made. Shipping documents, customs documents, video with the content of the container can be created or a URL link can be provided where this information can be found, all that information that can possibly be electronically attached to the Con, grouped under the name Con#. The TTP has now registered that sender Se owns a container Con. Senders puts the tag Con-PU-QR-PKI visible on the outside of the container.

IDENTIFY RECEIVER RE: Sender Se scans the Con-PR-QR-PKI and enters the Con-PW. Next, the Re-PU-QR-PKI of the receiver Re is scanned and the attributes are set (e.g. notify Re by mail each time the Con-PU-QR-PKI is scanned so that the receiver can follow the trail also). By this event a SK and a Re-PU-QR-PKI encrypted SK (=ESK) are created, to be used later for authentication of the Re.

IDENTIFY CHECKING ENTITY CE: Sender scans the Con-PR-QR-PKI and enters the Con-PW. Next the CE-PU-QR-PKI of the checking entity CE (e.g. customs) is scanned and the attributes are set (e.g. (links to) the customs documents Con#). A procedure to authenticate people to be able to carry a legitimate CE-PR-QR-PKI can be demonstrated in a previous case. By this event a SK and a CE-PU-QR-PKI encrypted SK (=ESK) are created, to be used later for authentication of the CE.

VERIFY container: When CE approaches the Con, he scans the Con-PU-QR-PKI at the outside, next he is asked to identify by scanning his CE-PR-QR-PKI and enters the CE-PW all within the defined time frame and on the same communication device. If the CE-PW and CE-PR-QR-PKI are valid (CE is on duty), the ESK is decrypted with CE-PR-QR-PKI, if that matches SK, the request is authentic and allowed by Se. CE now can select the documents Con# and can decide autonomously whether to physical inspect the container. This case demonstrated that the CE doesn't need to have documents in advance. This makes inspection on the road possible as well, identifying the goods inside the container. Depending on the settings, the sender and/or receiver are notified of the actions of CE. If needed, Se can admit an extra CE to list of accredited CE's, extra info, since only Se has the Con-PR-QR-PKI.

RECEIVE container: When Re receives the container, Re scans the Con-PU-QR-PKI, next he scans his Re-PR-QR-PKI and to enter the Re-PW. If all this matches and is performed within the defined time frame and on the same communication device, the ESK is decrypted with Re-PR-QR-PKI. If that matches SK, Re is authenticated, the Re can access information in Con# that Se has prepared. Se is notified that Re has received the container.

USAGE: besides customs who can now access anywhere the documents to a container, the method and system can be used by shipping companies, courier services, postal services etc. . . . . .

Case 7 (See FIG. 15(a-b))

The goal now is to send encrypted and/or electronically signed documents/messages or a registered letter. A message (Mes) needs to be sent from a sender (Se) to a receiver (Re). Depending on the setup, the Mes must be certified from the sender, or certified that only the receiver can read it, or both.

SETUP: The sender (Se) wants to send a message/document (Mes) to a receiver (Re), using a process according to the invention via a Trusted Third Party (TTP).

DEFINE THE SENDER AND RECEIVER: both parties have accessed the website of TTP (e.g. https://qr-pki.com) and have registered, creating a set of QR-PKI tags (a private QR-PKI-tag and a public QR-PKI-tag) and associated passwords (keys and QRtags can be copy/pasted from the browser or sent via e-mail). Depending on the TTP, at least the e-mail address has to be defined and checked (by e-mail confirmation), more information can be entered by means of attributes being defined and values entered (e.g. extra passwords, extra e-mail addresses).

The sender Se now has a private QRtag "Se-PR-QR-PKI", a public QRtag "Se-PU-QR-PKI" and a secret master password "Se-PW". Both QRtags are represented by an image (which can be read by said communication devices) and by an alphanumerical string (which can be sent electronically).

The receiver Re now has a private QRtag "Re-PR-QR-PKI", a public QRtag "Re-PU-QR-PKI" and a secret master password "Re-PW". Both QRtags are represented by an image (which can be read by said communication devices) and by an alphanumerical string (which can be sent electronically).

DEFINE THE MESSAGE: Sender (Se) requests a new QRtag for the message he wants to send to receiver (Re). Sender logs in at the TTP using his Se-PR-QR-PKI and certifying with his Se-PW. Sender requests a temporary single and unique key in form of a QRtag "Mes-QR-PKI". That QRtag is represented by an image (which can be read by said communication devices) and by an alphanumerical string (which can be sent electronically). Sender now has prepared an electronic document.

SEND PRINTED: in order to send a printed letter to a receiver and have the receiver electronically acknowledge the receipt of that letter, the sender prints the document with the Mes-QR-PKI printed on paper. Next the sender will scan the Mes-QR-PKI, then scan his Se-PR-QR-PKI and enter the Se-PW within the defined time frame and on the same communication device. Now he can define the receiver by scanning the Re-PU-QR-PKI he obtains from the Internet or directly from the receiver. A session key (SK) in the Mes-QR-PKI is encrypted with Re-PU-QR-PKI and stored in the event (ESK). Sender also sets the properties so that when the Mes-QR-PKI is scanned again, the receiver is asked to provide his Re-PR-QR-PKI and Re-PW and that sender is notified upon receipt. Sender now sends the printed letter via mail, fax, . . . to receiver. When receiver scans the Mes-QR-PKI followed by his Re-PR-QR-PKI and password Re-PW, the ESK is decrypted with Re-PR-QR-PKI, when it matches the key SK in the Mes-QR-PKI, the identity of Re is authentic and sender is notified.

SEND ELECTRONIC: to send an electronic encrypted message that only the receiver can read and that the receives knows that the message can only come from sender, sender is creating the message electronically. Next, the sender will scan the Mes-QR-PKI, then scan his Se-PR-QR-PKI and enter the Se-PW within the defined time frame and on the same communication device. Now he can define the receiver by scanning the Re-PU-QR-PKI he obtains from the Internet or directly from the receiver. A session key (SK) in the Mes-QR-PKI event is encrypted with Re-PU-QR-PKI and stored in the event as ESK. Sender uploads the electronic message or points to the location where the electronic message can be found. Next that information is a first time encrypted with Se-PR-QR-PKI key (that is named A), A is encrypted again by Re-PU-QR-PKI and stored (that is named B). Sender also sets the properties so that when the Mes-QR-PKI is scanned again, the receiver is asked to provide his private key and secret and that sender is notified upon receipt. Sender now closes the event. Sender sends the Mes-QR-PKI to receiver. Mes-QR-PKI can be printed and faxed, Mes-QR-PKI can be sent via SMS, mail, or can be sent via mail printed on a piece of paper. When receiver scans the received Mes-QR-PKI followed by his Re-PR-QR-PKI and password Re-PW, the ESK is decryption with Re-PR-QR-PKI, if the result matches SK, the message is for receiver. The double encrypted electronic message B, is decrypted with Re-PR-QR-PKI and becomes A again. Now he scans the Se-PU-QR-PKI and decrypts A again with Se-PU-QR-PKI, resulting in the original electronic message or link to the original message. The receiver is sure that only he can receive (the link to) the document and decrypt it, and only the sender could have sent this. Sender is now notified of the receipt, the Receiver can now retrieve the link to the electronic document and download it in readable form.

USAGE: Postal services can use this method and system.

Case 8 (See FIG. 16(a-b))

This relates to the disclosure of sensitive data to qualified people from a simple QRtag of the person involved. This case or a variant can be applied to systems for disclosing medical records to qualified doctors of medical staff only, for disclosing information on fines or penalties on driver licenses, to attach additional information to identity papers or documents or other similar schemes. In all cases the information is not stored on the carrier document itself, nor the QRtag. This makes it less vulnerable for theft or fraud, the linked information can only be viewed/changed by authorized persons. Since it concerns sensitive information, third parties might have to approve certain steps along the way.

SETUP: All parties are using a process according to the invention via a Trusted Third Party (TTP). A Person (Per) can have a card/container/document (Con) (e.g. a SIS card, a social security identification card). A qualified person (QP) (e.g. a doctor) wants to add some medical information (further called SDat) to be viewed by other doctors only (further called qualified persons or QPs), not to other, non-medical people. The person Per wants to add general data (GDat) (e.g. his address, contact details of family). In this example a few extra databases are involved. The table with all qualified persons (QPDB) (e.g. all doctors) administrated by QPadmin persons, a table which contains the access mechanisms to retrieve or to store the SDat from the SDat database (SDatDB), a table (further called LinkDB) which links the persons Per(x) or actually the Con(x) of that Per(x) to certain SDat(x). Since this scheme involves more than one person, more than one qualified person, all definitions are marked with indexes: Per(x), Con(y), QP(z), . . . TTP issues temporary QRtags; they are represented by an image (which can be read by said communication devices, or printed to have a hard copy) and by an alphanumerical string (which can be sent electronically). All databases are external to TTP and administrated by e.g. QPadmin or other organizations. For this case it is assumed that QPadmin is authorized to administrate all of the databases.

DEFINE THE PERSON (PER(x)), QUALIFIED PERSON (QP(a)) AND THE QP administration APadmin: all parties have accessed the website of TTP (e.g. https://qr-pki.com) and have registered, creating a set of QR-PKI tags (a private QR-PKI-tag and a public QR-PKI-tag) and associated passwords (keys and QRtags can be copy/pasted from the browser or sent via e-mail). Depending on the UP, at least the e-mail address has to be defined and checked (by e-mail confirmation), more information can be entered by means of attributes being defined and values entered (e.g. extra passwords, extra e-mail addresses).

The Person Per(x) now has a private QRtag "Per(x)-PR-QR-PKI", a public QRtag "Per(x)-PU-QR-PKI" and a secret master password "Per(x)-PW". Both QRtags are represented by an image (which can be read by said communication devices) and by an alphanumerical string (which can be sent electronically).

The QPDB (with the list of QP(a) and their permissions), and the administration of QP (QPadmin) authorizing QP(a) to be qualified or not now has: a private QRtag "QPadmin-PR-QR-PKI"; a public QRtag "QPadmin-PU-QR-PKI" and a secret master password "QPadmin-PW". Both QRtags are represented by an image (which can be read by said communication devices) and by an alphanumerical string (which can be sent electronically). QPadmin-PU-QR-PKI is published in channels that QP(a) have access to (e.g. medical journals).

The (yet to be) Qualified Person QP(a) now has a private QRtag "QP(a)-PR-QR-PKI", a public QRtag "QP(a)-PU-QR-PKI" and a secret master password "QP(a)-PW". Both QRtags are represented by an image (which can be read by said communication devices) and by an alphanumerical string (which can be sent electronically).

DEFINE THE CONTAINER/CARRIER/CARD: Person Per(x) requests or is attributed a card Con(x). Per(x) acquires a private QRtag "Con(x)-PR-QR-PKI", a public QRtag "Con(x)-PU-QR-PKI" and a secret master password "Con(x)-PW". Both QRtags are represented by an image (which can be read by said communication devices) and by an alphanumerical string (which can be sent electronically). Con(x)-PU-QR-PKI is printed on or attached to the card/carrier/container. Every Per(x) can change his own general data GDat(x) on the Con(x) by scanning the Con(x)-PR-QR-PKI and entering the correct password Con(x)-PW. Per(x) can now define what happens if someone scans his card (Con(x)-PU-QR-PKI): e.g. send an e-mail on every scan with details on the scan, show GDat(x) information, or send an SMS to a list of persons.

QUALIFICATION OF QP(a): To qualify, the QP(a) is scanning/entering the QPadmin-PU-QR-PKI, starting the qualification request. This has to be done only once in a given period, depending on the setup done by QPadmin and the rules agreed between parties. Next QP(a) is to identify. He scan or enters his QP(a)-PR-QR-PKI and asked to fill in some details as requested, and enter the QP(a)-PW, if the password matches, QP(a) is authenticated. A session key (SK) and a double encrypted version of the SK (=ESK) are created and stored. ESK=QPadmin-PU-QR-PKI encrypted SK and the result is then encrypted again with QP(a)-PR-QR-PKI. UP then issues a Temp1-QRtag (=link to ESK and the request for access by QP(a)=a license request) and sends Temp1-QRtag to QPadmin. Depending on the organization, QP(a) could mail Temp1-QRtag with the request or post a printed version of Temp1-QRtag on a formal letter to QPadmin. For QP(a) the request process is started, now he has to wait for the decision of QPadmin.

QPadmin (the QPDB administration, at their convenience) executes the Temp1-QR link request and enters its own QPadmin-PR-QR-PKI and QPadmin-PW. To check if the request is genuine the ESK is decrypted with QP(a)-PU-QR-PKI and then with QPadmin-PR-QR-PKI and checked against SK. If both match, the request is authentic. QPDB administration will then grant/revoke permission for the QP(a). That result is stored in a temporary QRtag (further called Lic-QR). Lic-QR is sent to the requesting QP(a) and stored in the QPDB. QP(a) executes or scans Lic-QR and is asked to authenticate with QP(a)-PR-QR-PKI and QP(a)-PW. The information is stored in the QP(a)-QR-PKI record and executes automatically. If QP(a) is qualified to be part of the group of "Qualified Personnel", he now is licensed to have access to SDatDB. If needed, QPadmin can revoke the license for QP(a) at any time. If the license has an expiration period, that will be contained in the Lic-QR.

HANDLE DATA: The mechanism to add/change data in the SDatDB systems is outside this scoop.

Assume QP(a) enters data SDat(y) concerning Per(y) in "a (medical) database" and a link to that SDat(y) is available. That "link to SDat(y)" with access rights, further called Link(y) is stored in SDatDB and is made available in the form of a QRtag (containing service-URL+Link(y)) on the screen of the QP(a), further called Temp3-QR. To link SDat(y) to Con(y) of Per(y), QP(a) scans Con(y)-PU-QR-PKI of Per(y). QP(a) is shown the GDat(y) of that Con(y), he can verify that it is the correct Per(y) and Con(y). Consecutively and within a define time frame and on the same said communication device, QP(a) scans his QP(a)-PR-QR-PKI and enters the QP(a)-PW thus validating his identity. Next, via Lic-QR, the validity of his status is checked with QPadmin. If that is still valid, QP(a) now has access to the QPDBs. All Link(y) are retrieved from the LinkDB for that Con(y) and those Link(y)'s are looked up SDat(y)'s and retrieved from SDatDB. On the said communication device of QP(a), a list of the medical (sensitive) data is displayed. If QP(a) is only consulting information, the event execution is stopped when the defined time frame is over (meaning that the links are disconnected, the info stays on the display). If QP(a) wants to add new information, he should execute the above procedure to get the history on the screen, but within the defined time frame, scan or enter the new information to be added in the form of Temp3-QR (image or string depending on the device used). This will update the LinkDB with Link(y) for Con(y). If needed the event associated with Temp3-QR can have a limited lifespan, this means that if Temp3-QR is used later then the expiration date, the "link" isn't valid anymore and all kinds of notifications can be activated. If some QP(z) turn rogue, his license in the QPDB can be revoked by QPadmin authorities, leaving every other information intact and accessible for other licensed QP's.

READ DATA ONLY: If someone scans Con(z)-PU-QR-PKI, he will get the Gdat(z) and Per(z) will get a notification if that is configured. If QP(a) scans Con(z)-PU-QR-PKI, he will get the Gdat(z) also.

USAGE: this kind of setups can be realized in lots of schemes where information should be attached to a specific object or container. Combing this technique with the technique used to fight against counterfeit, the total scheme gives a new way to handle and protect information. Using the scheme, sensitive or external data is linked to that object (the public part of the QR-PKI) not stored in any of the Events associated with the object. This means that the owner of the object can't change or read the associated data, only qualified persons that have access to external (link) databases. The same scheme can be setup with different entities (medical, law enforcement, driver license, . . . ) all connected to the same object, but all having different access layers. Stored in the Event of the object is the GDat, the owner can be notified on every view someone does, becoming aware of information be retrieved.

In connection with the case explained above, if the Per(x) is having an accident on the street, any bystander can scan the Con(x) and indirectly notify some people (including a doctor who knows the patient is having a heart condition), if needed a bi-directional communication can be setup between the doctor (or 911/112 personnel) to have an onsite witness (the bystander scanning Per(x)). When the first medical assistants arrive on the scene, they can immediately access all necessary (medical) information to treat the patient with the right attention. Besides that, family and other crucial relations can be automatically informed as defined in the event.

Case 9

As explained in Wikipedia, in marketing a coupon is a ticket or document that can be exchanged for a financial discount or rebate when purchasing a product. Customarily, coupons are issued by manufacturers of consumer packaged goods or by retailers, to be used in retail stores as a part of sales promotions. They are often widely distributed through mail, coupon envelopes, magazines, newspapers, the Internet, directly from the retailer, and mobile devices such as cell phones.

This case describes the handling of electronic coupons or e-coupons through (mobile) terminals, i.e. virtual teleporting e-coupons via terminals between the issuer and the consumer. Coupons, created by the manufacturer or issuer, are distributed by the issuer or by a middle man, and transferred to the consumer. The consumer can redeem the coupon later to get the discount, rebate, service or product. This case combines methods described in the previous cases to constitute the handling of said e-coupons.

In the description below the issuer or manufacturer is called 'Iss' the distributer or merchant is further called 'Dis', the consumer receiving the coupon and redeeming it later is further called 'Con', the e-coupon or e-coupons themselves are further called 'E-c'.

Figure 4:
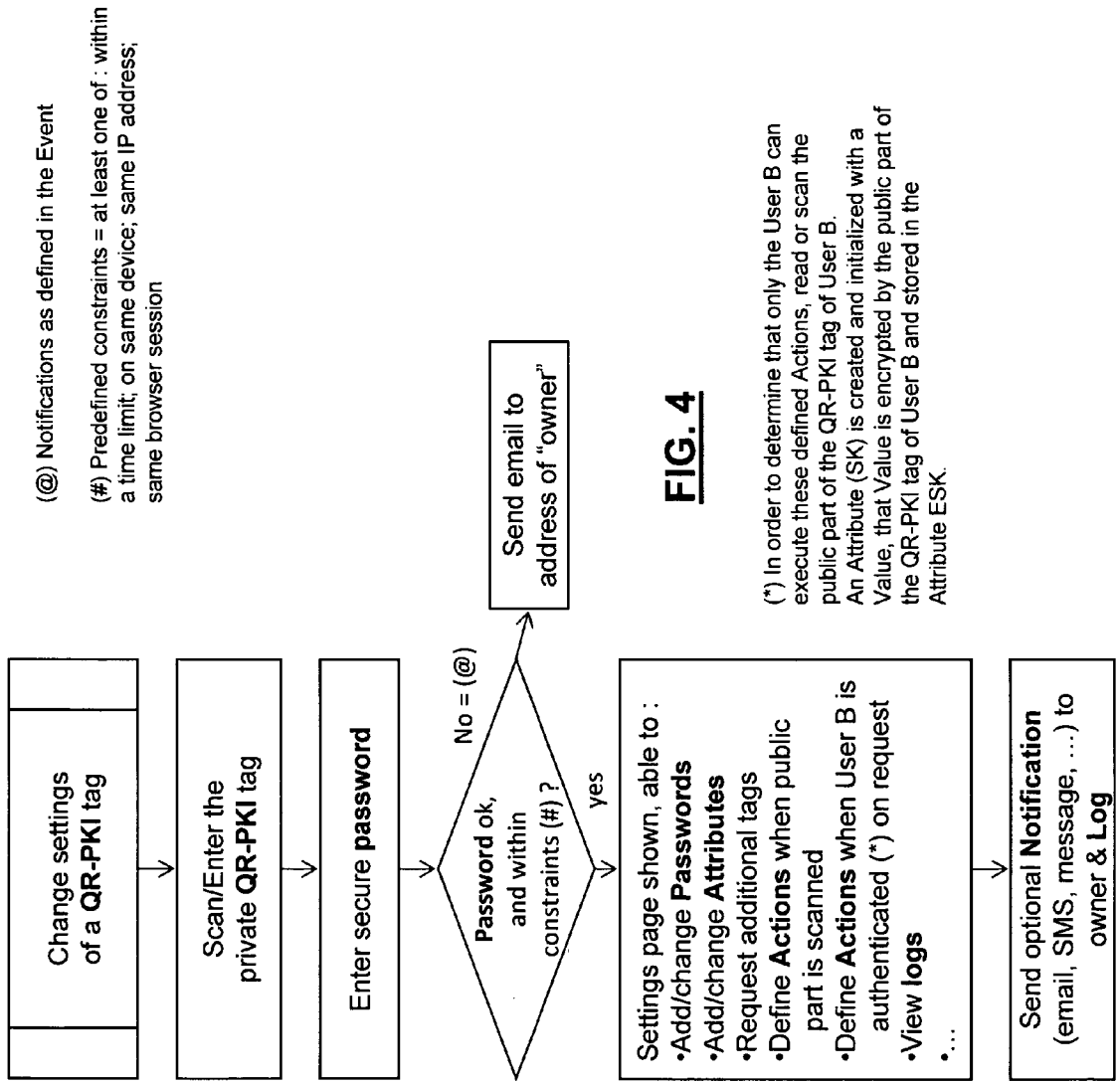
FIG. 4 shows an example of a procedure according to the invention for changing attributes of the authentication codes and/or defining actions for the authentication codes.

Coupons themselves exist in four types (depending on the usage), the E-c handles accordingly:

1. One coupon for everyone, ownership is not transferred when the coupon is taken
    E-c can be "easily" copied, duplicated amongst friends=copy of original
    equals a paper leaflet or flyer, but in electronic version
    one friend can give to another the SAME E-c
    e.g. a leaflet for a party, who has a copy on the mobile can enter with 10% off 2. Each coupon is unique, but ownership is not transferred when the coupon is taken
    E-c can be copied, can be given to a friend, but it is NOT a duplicate
    equals a paper leaflet with something unique e.g. number, barcode,
    one friend can give to another the NEXT coupon
    no problem when exact duplication occurs, they link anyway each time to a DIFFERENT number of E-c.
    e.g. a limited number of leaflets for a party with limited places 3. One coupon for everyone, ownership is transferred when the coupon is taken
    E-c once transferred, is locked in with receiver, redeeming possible only by receiver
    equals you subscribing to an offer from a magazine
    If one friend sends the original (e.g. photo, URL) or the received E-c to another friend, that friend has to subscribe too.
    e.g. an entry ticket for a park, identity of owner is checked when entering 4. Each coupon is unique, ownership is transferred when the coupon is taken
    E-c once transferred, is locked with receiver, redeeming possible only by receiver
    equals you buy a cinema ticket on-line, limited distribution as places are unique
    if one friend sends the original (e.g. photo, URL) or the received E-c to another friend, that friend has to subscribe/pay too
    e.g. an entry ticket to a movie or theatre with limited number of places SETUP: Both Iss and Dis use FIG. 3 to create their own QRtags, and optionally configure their QRtags using FIG. 4, so that both have an online ID and can use this in their electronic communication via terminals to identify themselves irreversibly in the online world. To create the 'E-c', Iss is using FIG. 5 to create a desired number full QRtags that represent the 'E-c' and change the behaviour/properties of the 'E-c' using FIG. 4, or (alternative) uses FIG. 6 to create a desired number temporally QRtags with defined properties and behaviour that represent the 'E-c'. The difference between full and temporally 'E-c' is that the properties and behaviour of a full 'E-c' can be adjusted later, while with temporally 'E-c' said properties and behaviour are fixed on creation of the QRtags. For commercial reasons, the domain name part of the first string (1) and the second string (2), or the domain name in the temporally string, can be any domain name that can be forwarded to the authentication server system (10), licensed and capable of handling QRPKI tags (e.g. QRPKI.COM). 'Iss' can now send a desired number of 'E-c' to a 'Dis' using a modified case 7 (registered letter) in which the ownership of the 'E-c' is transferred to the receiver as part of the logical expressions executed when "true", or case 6 (transfer a container) in case a physical transport is needed, or case 4 (electronic payment) in which the eWallet contains a set of 'E-c' and the action "payment" is replaced by an action that transfers ownership of the said set of 'E-c' to the 'Dis'.

DISTRIBUTION: The 'Dis' now has a number of 'E-c' at his disposal to distribute to 'Con'. 'Dis' now can create a new QRtag (see FIG. 5) in which actions are defined so that a 'E-c' (amongst other info) are issued and transferred when the public part of this new QRtag is scanned by a 'Con', 'Dis' can now use any way he sees fit to distribute the 'E-c', via printed media, flyers, stickers, billboards, TV-ads, web sites, . . . in which he will display the public part of the new QRtag. The consumers/people reading/scanning the 'E-c' can be divided into three categories. The first category concerns consumers that do not have an own QRtag and do not want to create one now, that category of people can accept 'E-c' of type 1 and 2 (ownership not transferred) directly, or they can store the embedded link, copy the image of the QRtag and perform the acceptance later (if the actions defined behind the coupon-QRtag will allow this). A second category of people do not have own QRtags at the moment they are reading the coupon-QRtag, but are willing to create one electronic ID on the spot, that category of people can accept all types of 'E-c', but the 'E-c' that require transfer of ownership will remains unusable until they have performed the activation step in FIG. 3. The third category of people already having an online ID in the form of an own QRtag according to FIG. 3, can accept all types 'E-c'.

REDEEM AN E-COUPON: When a consumer accepts a 'E-c', this 'E-c' is attached to (the online representation of) that 'Con', depending on the type of 'E-c', ownership is transferred (types 3 and 4) or not (type 1 and 2). Redeeming the 'E-c' is the process in which the 'Con' presents the 'E-c' to a "certified or authorized assistant" of the 'Iss', who can exchange the 'E-c' for the promoted value, only then the 'E-c' is redeemed. A simplified case 2 (Identify Agent) can be used to certify or authorize assistants, Case 4 (FIG. 12*b*, e-Wallet payment part) can be used where the assistants or 'Iss' has the role of e-Wallet owner, redeeming the 'E-c'. After redeeming, the 'E-c' role is changed (actions to be performed when the QRtags are read), it can link to e.g. a promotion video or give out details for next products.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for authenticating an entity, comprising the steps of:
   providing first and second users with sets of authentication codes, each set comprising at least one secret, a private key container and a matching public key container, the private and public key containers being generated from respectively a first string comprising a domain name of an authentication server system and a PKI private key and a second string comprising the same domain name and a matching PKI public key;
   receiving on the authentication server system one of the first strings as a result of a first user reading the respective private key container by means of a compatible terminal arranged for reading said private and public key containers and/or entering said first and second strings onto the Internet, and performing the following action definition procedure:
   a) requesting the first user to enter a secret;
   b) receiving the secret entered by the first user on the authentication server system;
   c) checking if the received secret and the received first string belong to the same set of authentication codes and if the received secret and the received first string meet predefined constraints; and
   d) if the check returns a positive result, requesting the first user to define a set of actions which are to be performed upon receipt of the second string belonging to the same set of authentication codes on the authentication server system.

2. The method according to claim 1, wherein the predefined constraints comprise at least one of the following: a predefined time-frame within which the received first string and the received secret must have been received; that the received first string and the received secret were received from the same terminal; that the received first string and the received secret were sent from a same IP address; and that the received first string and the received secret were entered during a same browser session.

3. The method according to claim 1, wherein at least one of the first and second strings, from which the private and public key containers are generated, further comprises at least one parameter and/or identifier.

4. The method according to claim 1, wherein each set of authentication codes comprises additional user-definable secrets, wherein the action definition procedure comprises the step of associating a predefined procedure to each of the additional user-definable secrets, and wherein the method further comprises the steps of: receiving one of the additional user-definable secrets on the authentication server system and performing the associated predefined procedure.

5. The method according to claim 1 any one of the claim 1, wherein step d comprises the further steps of creating a temporary key in the form of a container for the first user and defining a set of actions which are to be performed upon receipt of the temporary key on the authentication server system.

6. The method according to claim 1, wherein step d comprises the further steps of assigning an entity set of authentication codes to the first user, said entity set being one of said sets of authentication codes of which the public key container is provided for attachment to, association with or virtual representation of an entity of the first user.

7. The method according to claim 1, wherein the definition of the set of actions in step d comprises the steps of: requesting the first user to define a set of logical expressions with conditions to be evaluated upon the receipt of the second string on the authentication server system, and to define a first set of actions to be performed for each user-definable secret if the evaluation of the logical expression returns "true" and a second set of actions to be performed for each user-definable secret if the evaluation of the logical expression returns "false".

8. The method according to claim 7, wherein the method further comprises the step of receiving on the authentication server system one of the second strings as a result of a second user reading the respective public key container by means of a further terminal arranged for reading said private and public key containers and/or for entering said one second string onto the Internet, and performing the following activation procedure:
   a') retrieving the set of logical expressions and actions which has been defined for the received second string; and
   b') evaluating the set of logical expressions and performing for each expression the first set of actions or the second set of actions depending on the result of the evaluation being "true" or "false".

9. The method according to claim 7, wherein the method further comprises the step of receiving on the authentication server system one of the second strings as a result of a second user reading the respective public key container by means of a further terminal arranged for reading said private and public key containers and/or for entering said one second string onto the Internet, and performing the following authentication and activation procedure:

a') requesting the second user to read the private key container and enter a secret of the set of authentication codes which has been associated with set of authentication codes;

b') receiving the respective first string, as a result of the second user reading the requested private key container, and the secret which the second user has entered, on the authentication server system;

c') checking if the received secret and the received first string of the second user belong to the same set of authentication codes, and if the received secret and the received first string meet predefined constraints;

d') depending on the result, retrieving the set of logical expressions and actions which have been defined for the received private key container or the received first string; and e') evaluating the set of logical expressions and performing for each expression the first set of actions or the second set of actions depending on the result of the evaluation.

10. The method according to claim 1, wherein said container is a QR-code, a RFID tag, a NFC tag or a text message.

11. A computer program product stored on a non-transient medium and being in a format executable on a programmable device, the computer program product containing instructions, which, when executed on said programmable device performs the following method:

providing first and second users with sets of authentication codes, each set comprising at least one secret, a private key container and a matching public key container, the private and public key containers being generated from respectively a first string comprising a domain name of an authentication server system and a PKI private key and a second string comprising the same domain name and a matching PKI public key;

receiving on the authentication server system one of the first strings as a result of a first user reading the respective private key container by means of a compatible terminal arranged for reading said private and public key containers and/or entering said first and second strings onto the Internet, and performing the following action definition procedure:

a) requesting the first user to enter a secret;
b) receiving the secret entered by the first user on the authentication server system;
c) checking if the received secret and the received first string belong to the same set of authentication codes and if the received secret and the received first string meet predefined constraints; and
d) if the check returns a positive result, requesting the first user to define a set of actions which are to be performed upon receipt of the second string belonging to the same set of authentication codes on the authentication server system.

12. A system for authenticating an entity, comprising an authentication server system provided with means for providing first and second users with sets of authentication codes, each set comprising at least one secret, a private key container and a matching public key container, the private and public key containers generated from respectively a first string comprising a domain name of said authentication server system (10) and a PKI private key and a second string comprising the same domain name and a matching PKI public key, means for receiving one of the first strings as a result of a first user reading the respective private key container by means of a compatible terminal arranged for reading said private and public key containers and/or entering said first and second strings onto the Internet, and for performing upon said receipt the following action definition procedure:

a) requesting the first user to enter a secret;
b) receiving the secret entered by the first user on the authentication server system;
c) checking if the received secret and the received first string belong to the same set of authentication codes and if the received secret and the received first string meet predefined constraints; and
d) if the check returns a positive result, requesting the first user to define a set of actions which are to be performed upon receipt of the second string belonging to the same set of authentication codes on the authentication server system.

13. The system according to claim 12, wherein the predefined constraints comprise at least one of the following: a predefined time-frame within which the received first string and the received secret must have been received; that the received first string and the received secret were received from the same terminal; that the received first string and the received secret were sent from a same IP address; that the received first string and the received secret were entered during the same browser session.

14. The system according to claim 12, wherein at least one of the first and second strings, from which the private and public key containers are generated, further comprises at least one parameter and/or identifier.

15. The system according to claim 12, wherein each set of authentication codes comprises additional user-definable secrets, wherein the action definition procedure comprises the step of associating a predefined procedure to each of the additional user-definable secrets, and wherein authentication server system is further arranged for receiving one of the additional user-definable secrets and performing the associated predefined procedure.

16. The system according to claim 12, further arranged for creating a temporary key in the form of a container for the first user and defining a set of actions which are to be performed upon receipt of the temporary key on the authentication server system.

17. The system according to claim 12, further arranged for assigning an entity set of authentication codes to the first user, said entity set being one of said sets of authentication codes of which the public key container is provided for attachment to, association with or virtual representation of an entity of the first user.

18. The system according to claim 12, wherein the definition of the set of actions comprises the steps of: requesting the first user to define a set of logical expressions with conditions to be evaluated upon the receipt of the second string on the authentication server system, and to define a first set of actions to be performed for each user-definable secret if the evaluation of the logical expression returns "true" and a second set of actions to be performed for each user-definable secret if the evaluation of the logical expression returns "false".

19. System The system according to claim 18, wherein the authentication server system is further arranged for receiving one of the second strings as a result of a second user reading the respective public key container by means of a further terminal arranged for reading said private and public key containers and/or for entering said one second string onto the Internet, and performing the following activation procedure:
- a') retrieving the set of logical expressions and actions which has been defined for the received second string; and
- b') evaluating the set of logical expressions and performing for each expression the first set of actions or the second set of actions depending on the result of the evaluation being "true" or "false".

20. The system according to claim 12, wherein the authentication server system is further arranged for receiving one of the second strings as a result of a second user scanning the respective public key container by means of a further terminal arranged for reading said private and public key containers and/or for entering said one second string onto the Internet, and performing the following authentication and activation procedure:
- a') requesting the second user to scan the private key container and enter a secret of the set of authentication codes which has been associated with set of authentication codes;
- b') receiving the respective first string, as a result of the second user scanning the requested private key container, and the received secret which the second user has entered, on the authentication server system;
- c') checking if the received secret and the received first string of the second user belong to the same set of authentication codes, and if the received secret and the received secret and the received first string meet predefined constraints;
- d') depending on the result, performing the set of logical expressions and actions which have been defined for the received private PKI key of the first string; and
- e') evaluating the set of logical expressions and performing for each expression the first set of actions or the second set of actions depending on the result of the evaluation.

21. The method according to claim 1, wherein at least one of the following group of entities is authenticated or secured: an object; a facility; an electronic payment; an authenticity certificate associated with a product; a shipping container; an encrypted and/or electronically signed correspondence; sensitive data to which access is to be restricted to a limited number of persons; a coupon or e-coupon; a person; an agent or representative of a company visiting a premises; a customs agent; a police officer; a person with a mandate whereby that mandate needs to be authenticated by a third person; an electronic coupon or voucher.

22. The system according to claim 12, wherein the system is arranged for authenticating or securing at least one of the following group of entities: an object; a facility; an electronic payment; an authenticity certificate associated with a product; a shipping container; an encrypted and/or electronically signed correspondence; sensitive data to which access is to be restricted to a limited number of persons; a coupon or e-coupon; a person; an agent or representative of a company visiting a premises; a customs agent; a police officer; a person with a mandate whereby that mandate needs to be authenticated by a third person; an electronic coupon or voucher.

* * * * *